United States Patent
Jones et al.

(10) Patent No.: US 10,457,902 B2
(45) Date of Patent: Oct. 29, 2019

(54) SOLID TABLET UNIT DOSE OVEN CLEANER

(71) Applicant: Ecolab USA Inc., Saint Paul, MN (US)

(72) Inventors: Caleb Jones, Minneapolis, MN (US); Katherine Molinaro, Eagan, MN (US); Darryl Bowling, Madison, NC (US); Karen Rigley, Greensboro, NC (US); Brenda Lynn Tjelta, St. Paul, MN (US); Lisa Maureen Sanders, Eagan, MN (US); Michael Edward Besse, Golden Valley, MN (US)

(73) Assignee: Ecolab USA Inc., Saint Paul, MN (US)

( * ) Notice: Subject to any disclaimer, the term of this patent is extended or adjusted under 35 U.S.C. 154(b) by 0 days.

(21) Appl. No.: 14/587,519

(22) Filed: Dec. 31, 2014

(65) Prior Publication Data
US 2016/0002576 A1 Jan. 7, 2016

Related U.S. Application Data

(63) Continuation of application No. 13/734,204, filed on Jan. 4, 2013, now Pat. No. 8,951,956, which is a continuation-in-part of application No. 13/372,560, filed on Feb. 14, 2012, now Pat. No. 8,389,464, which is a continuation of application No. 12/832,201, filed on Jul. 8, 2010, now Pat. No. 8,138,138, which is a continuation-in-part of application No. 11/969,385, filed on Jan. 4, 2008, now Pat. No. 7,763,576.

(51) Int. Cl.
| | | |
|---|---|---|
| C11D 17/00 | (2006.01) | |
| C11D 3/08 | (2006.01) | |
| C11D 3/04 | (2006.01) | |
| C11D 3/10 | (2006.01) | |
| C11D 3/37 | (2006.01) | |
| C11D 3/00 | (2006.01) | |
| C08L 33/02 | (2006.01) | |

(52) U.S. Cl.
CPC ........ *C11D 17/0047* (2013.01); *C11D 3/0057* (2013.01); *C11D 3/044* (2013.01); *C11D 3/08* (2013.01); *C11D 3/10* (2013.01); *C11D 3/3761* (2013.01); *C11D 17/0065* (2013.01); *C11D 17/0073* (2013.01); *C08L 33/02* (2013.01)

(58) Field of Classification Search
CPC ........................ C11D 17/0047; C11D 17/0065
USPC ......................................... 510/446, 476, 509
See application file for complete search history.

(56) References Cited

U.S. PATENT DOCUMENTS

| | | | |
|---|---|---|---|
| 3,514,376 A * | 5/1970 | Salutsky ................ | B01J 2/30 203/11 |
| 3,562,165 A | 2/1971 | Altieri | |
| 3,590,001 A | 6/1971 | Taylor et al. | |
| 3,741,911 A | 6/1973 | Shane et al. | |
| 3,948,818 A | 4/1976 | Tomiyama et al. | |
| 4,013,577 A | 3/1977 | Wixon | |
| 4,299,739 A | 11/1981 | Esposito et al. | |
| 4,430,126 A | 2/1984 | Ackermann et al. | |
| 4,595,520 A * | 6/1986 | Heile et al. ................ | 510/380 |
| 4,820,440 A * | 4/1989 | Hemm ................ | C11D 3/044 510/108 |
| 4,971,714 A | 11/1990 | Lokkesmoe et al. | |
| 5,158,710 A | 10/1992 | VanEenam | |
| 5,292,446 A | 3/1994 | Painter et al. | |
| 5,340,501 A * | 8/1994 | Steindorf ................ | 510/224 |
| 5,368,008 A | 11/1994 | Oslin | |
| 5,552,556 A | 9/1996 | Miracle et al. | |
| 5,559,089 A | 9/1996 | Hartman et al. | |
| 5,599,781 A | 2/1997 | Haeggberg et al. | |
| 5,635,103 A | 6/1997 | Willey et al. | |
| 5,640,946 A | 6/1997 | Oslin | |
| 5,719,111 A * | 2/1998 | van den Brom ......... | C11D 3/08 510/224 |
| 5,759,976 A * | 6/1998 | Roach et al. .............. | 510/218 |
| 5,759,977 A * | 6/1998 | van den Brom ......... | C11D 3/06 510/224 |
| 5,798,326 A | 8/1998 | Goldstein et al. | |
| 6,057,281 A | 5/2000 | Stamm | |
| 6,410,890 B1 | 6/2002 | Kohlstrung | |

(Continued)

FOREIGN PATENT DOCUMENTS

| | | |
|---|---|---|
| CA | 2829301 A1 | 9/2013 |
| CN | 1237620 A | 12/1999 |

(Continued)

OTHER PUBLICATIONS

Ecolab USA Inc., PCT/US2013/078513 filed Dec. 31, 2013, "The International Search Report and the Written Opinion of the International Searching Authority, or the Declaration", dated Apr. 23, 2014.

Galiano et al., "Stabilization/solidification of a municipal solid waste incineration residue using fly ash-based geopolymers", Journal of Hazardous Materials, 9 pages, issued on Sep. 18, 2010.

Provis et al., "Correlating mechanical and thermal properties of sodium silicate-fly ash geopolymers", Colloids and Surfaces A: Pysicochemical and Engineering Aspects, 7 pages, issued on Nov. 21, 2008.

(Continued)

*Primary Examiner* — Mark Eashoo
*Assistant Examiner* — M. Reza Asdjodi
(74) *Attorney, Agent, or Firm* — McKee, Voorhees & Sease, PLC

(57) ABSTRACT

A solidification matrix includes sodium hydroxide, sodium carbonate, a water charge, an anhydrous metasilicate, a polycarboxylic acid polymer or salt or derivative thereof, and additional functional ingredients. The sodium hydroxide, sodium carbonate, a water charge, an anhydrous metasilicate, a polycarboxylic acid polymer, and additional functional ingredients interact to form a hydrate solid. The solidification matrix may be used, for example, in a solid detergent composition. Methods of making solid detergent compositions are disclosed.

16 Claims, 4 Drawing Sheets

(56) References Cited

U.S. PATENT DOCUMENTS

| | | |
|---|---|---|
| 6,440,918 B1 | 8/2002 | France |
| 6,528,471 B1* | 3/2003 | Del Duca et al. ............ 510/318 |
| 6,638,902 B2 | 10/2003 | Tarara et al. |
| 6,660,707 B2* | 12/2003 | Lentsch et al. ............... 510/445 |
| 6,772,751 B2 | 8/2004 | Deuringer et al. |
| 6,777,383 B1* | 8/2004 | Scepanski ............ H04L 9/3268 |
| | | 510/392 |
| 6,812,195 B2 | 11/2004 | Wierenga et al. |
| 6,835,702 B2 | 12/2004 | Herdt et al. |
| 6,835,706 B2 | 12/2004 | Lentsch et al. |
| 7,421,987 B2 | 9/2008 | Lou |
| 7,642,224 B2 | 1/2010 | McRae et al. |
| 7,759,300 B2 | 7/2010 | Besse et al. |
| 7,763,576 B2 | 7/2010 | Tjelta et al. |
| 7,888,303 B2 | 2/2011 | Tjelta et al. |
| 7,893,012 B2 | 2/2011 | Tjelta et al. |
| 7,902,137 B2 | 3/2011 | Kneipp et al. |
| 7,922,828 B2 | 4/2011 | Smith et al. |
| 3,093,200 A1 | 1/2012 | Bartelme et al. |
| 8,101,027 B2 | 1/2012 | Vandermeulen et al. |
| 8,123,867 B2 | 2/2012 | Tropsch |
| 8,138,138 B2 | 3/2012 | Tjelta et al. |
| 8,198,228 B2 | 6/2012 | Tjelta et al. |
| 8,338,352 B2 | 12/2012 | Tjelta et al. |
| 8,361,952 B2 | 1/2013 | Silvernail et al. |
| 8,389,464 B2 | 3/2013 | Tjelta et al. |
| 8,530,403 B2 | 9/2013 | Tjelta et al. |
| 8,815,791 B2 | 8/2014 | Neplenbroek et al. |
| 8,951,956 B2 | 2/2015 | Jones et al. |
| 2002/0064854 A1 | 5/2002 | Takaiwa et al. |
| 2002/0177541 A1* | 11/2002 | Tarara et al. ................... 510/392 |
| 2003/0109403 A1* | 6/2003 | Man ....................... C11D 3/046 |
| | | 510/367 |
| 2005/0233920 A1* | 10/2005 | Stolte et al. ................... 510/147 |
| 2007/0225197 A1* | 9/2007 | Kruse et al. ................... 510/444 |
| 2008/0015133 A1 | 1/2008 | Rigley et al. |
| 2008/0188391 A1 | 8/2008 | Seebeck et al. |
| 2008/0214425 A1 | 9/2008 | Lant et al. |
| 2008/0274930 A1 | 11/2008 | Smith et al. |
| 2008/0274940 A1* | 11/2008 | Tjelta ....................... C11D 3/10 |
| | | 510/445 |
| 2009/0011973 A1* | 1/2009 | Besse et al. ............ C11D 3/20 |
| | | 510/445 |
| 2009/0176687 A1* | 7/2009 | Tjelta ....................... C11D 3/10 |
| | | 510/445 |
| 2010/0000579 A1 | 1/2010 | Reinbold et al. |
| 2010/0160202 A1 | 6/2010 | Housmekerides et al. |
| 2010/0311634 A1 | 12/2010 | Besse et al. |
| 2010/0317559 A1 | 12/2010 | Ryther et al. |
| 2011/0021403 A1 | 1/2011 | Miralles et al. |
| 2011/0053819 A1 | 3/2011 | Preuschen et al. |
| 2011/0071065 A1 | 3/2011 | Silvernail et al. |
| 2011/0118166 A1 | 5/2011 | Tjelta et al. |
| 2011/0124547 A1 | 5/2011 | Tjelta et al. |
| 2011/0257431 A1 | 10/2011 | Baumann et al. |
| 2011/0301072 A1 | 12/2011 | Smith et al. |
| 2012/0010117 A1 | 1/2012 | Seebeck et al. |
| 2012/0053104 A1 | 3/2012 | Olson et al. |
| 2012/0067373 A1 | 3/2012 | Souter et al. |
| 2012/0108484 A1 | 5/2012 | Becker et al. |
| 2012/0149628 A1 | 6/2012 | Tjelta et al. |
| 2012/0165237 A1 | 6/2012 | Silvernail |
| 2012/0329700 A1* | 12/2012 | Silvernail ................ C11D 3/10 |
| | | 510/451 |
| 2013/0045909 A1 | 2/2013 | Silvernail et al. |
| 2013/0068254 A1 | 3/2013 | Besse et al. |
| 2013/0146094 A1 | 6/2013 | Riefenstein et al. |
| 2013/0252871 A1 | 9/2013 | Olson et al. |
| 2014/0018278 A1 | 1/2014 | Song et al. |
| 2014/0031273 A1 | 1/2014 | Walters et al. |
| 2014/0134709 A1 | 5/2014 | Andersen et al. |
| 2014/0364353 A1 | 12/2014 | Patterson et al. |

FOREIGN PATENT DOCUMENTS

| | | |
|---|---|---|
| CN | 1469921 A | 1/2004 |
| CN | 101684614 A | 3/2010 |
| CN | 101896594 B | 3/2014 |
| DE | 3215812 C2 | 11/1983 |
| DE | 19730610 C1 | 10/1998 |
| DE | 19838864 A1 | 3/2000 |
| DE | 19950649 A1 | 5/2001 |
| DE | 19961835 A1 | 7/2001 |
| DE | 10017966 A1 | 10/2001 |
| DE | 20220493 U1 | 11/2003 |
| EP | 0812808 A1 | 12/1997 |
| EP | 1478886 B1 | 4/2007 |
| EP | 2166092 A1 | 3/2010 |
| EP | 2361964 A1 | 8/2011 |
| GB | 534745 A | 10/1939 |
| GB | 534745 A | 3/1941 |
| GB | 1221186 | 2/1971 |
| GB | 1232120 | 5/1971 |
| JP | 2008050410 A | 3/2008 |
| WO | 0058430 | 10/2000 |
| WO | 02068876 A1 | 9/2002 |
| WO | 03073002 A1 | 9/2003 |
| WO | 2008095562 A1 | 8/2008 |
| WO | 2009087540 A1 | 7/2009 |
| WO | 2009092699 A1 | 7/2009 |
| WO | 2010045686 A1 | 4/2010 |
| WO | 2010136987 A2 | 12/2010 |
| WO | 2011003842 A1 | 1/2011 |
| WO | 2011025624 A1 | 3/2011 |
| WO | 2011080540 A1 | 7/2011 |
| WO | 2011100344 A1 | 8/2011 |
| WO | 2011116775 A1 | 9/2011 |
| WO | 2011144699 A1 | 11/2011 |
| WO | 2012025740 A1 | 3/2012 |
| WO | 2012028203 A1 | 3/2012 |
| WO | 2012038755 A1 | 3/2012 |
| WO | 2012098522 A2 | 7/2012 |

OTHER PUBLICATIONS

Sasai et al., "Preparation and characterization of activated carbon/zeolite composites from industrial solid wastes", www.witpress.com, retrieved from the internet on Dec. 2, 2015.

Subramanian et al., "Studies on Chemical Speciation of Sodium Aerosols Produced in Sodium Fire", Nuclear Technology vol. 165, 13 pages, issued on Jul. 1, 2008.

European Patent Office, "Extended Search Report", issued in connection to International Application No. 13870378.0, dated Jul. 13, 2016, 11 pages. 1.

United States Patent and Trademark Office, "Non-final Office Action", issued in connection to U.S. Appl. No. 13/712,506, dated Jun. 26, 2015, 13 pages.

BASF Safety Data Sheet—Trilon* M Liquid, Version 1.0 (7 pages) Mar. 27, 2006.

Lanxess Energizing Chemistry Safety Data Sheet, 000969/09, Revised Apr. 26, 2004 (4 pages) Oct. 6, 2004.

PQ Corporation—Material Safety Data Sheet—RU Sodium Silicate Solution (5 pages) Jun. 13, 2006.

Rohm and Haas—Acumer 1000 Scale inhibitor (2 pages) Jan. 31, 2002.

Ecolab USA Inc., PCT/US2013/064748 filed Oct. 13, 2013, "The International Search Report and the Written Opinion of the International Searching Authority, or the Declaration", dated Jan. 28, 2014.

Industrial Chemicals Division—PQ Corporation, "Bulletin 17-2A Typical Property Data for PQ Liquid Sodium Silicates", 2007 (1 page). Dec. 31, 2007.

Rohm and Haas—Material Safety Data Sheet—Acumer (TM) 1000 Polymer, (6 pages) Sep. 24, 2007.

Ecolab, "Apex Metal Protection, Metal-Safe Dish Machine Detergent" Labels, 1 page, as early as May 31, 2013.

(56) References Cited

OTHER PUBLICATIONS

Ecolab, "Apex Metal Protection Metal-Safe Dish Machine" Labels, 1 page, after Nov. 1, 2013.

\* cited by examiner

SOLID TABLET UNIT DOSE OVEN CLEANER

CROSS-REFERENCE TO RELATED APPLICATION

This application is a Continuation Application of U.S. Ser. No. 13/734,204 filed Jan. 4, 2013, which is a continuation-in-part of U.S. application Ser. No. 13/372,560, filed Feb. 14, 2012, now U.S. Pat. No. 8,389,464 issued on Mar. 5, 2013, which is a continuation of U.S. application Ser. No. 12/832,201, filed Jul. 8, 2010, now U.S. Pat. No. 8,138,138, which is a continuation-in-part of U.S. application Ser. No. 11/969,385, filed Jan. 4, 2008, now U.S. Pat. No. 7,763,576, each of which are incorporated herein in reference in their entirety.

FIELD OF THE INVENTION

The present invention relates generally to the field of solidification and solidification matrices. The present invention relates to solidification of a phosphate-free alkaline detergent composition. In particular, the present invention relates to a phosphate-free alkaline detergent composition including sodium hydroxide, sodium carbonate, anhydrous sodium metasilicate and preferably a polycarboxylic acid polymer as part of the solidification matrix.

BACKGROUND

The use of solidification technology and solid block detergents in institutional and industrial operations was pioneered in the SOLID POWER® brand technology claimed for example in Fernholz et al., U.S. Reissue Pat. Nos. 32,762 and 32,818. Additionally, sodium carbonate hydrate cast solid products using substantially hydrated sodium carbonate materials was disclosed in Heile et al., U.S. Pat. Nos. 4,595,520 and 4,680,134, which are herein incorporated by reference in its entirety.

In more recent years, attention has been directed to producing highly effective detergent materials from less caustic materials such as soda ash, also known as sodium carbonate. Early work in developing the sodium carbonate based detergents found that sodium carbonate hydrate-based materials often swelled, (i.e., were dimensionally unstable) after solidification. Such swelling can interfere with packaging, dispensing, and use. The dimensional instability of the solid materials relates to the unstable nature of various hydrate forms prepared in manufacturing the sodium carbonate solid materials. Early products made with hydrated sodium carbonate typically comprised of anhydrous, a one mole hydrate, a seven mole hydrate, a ten mole hydrate or more mixtures thereof. However, after the product had been manufactured and stored at ambient temperatures, the hydration state of the initial product was found to shift between hydrate forms, e.g., one, seven, and ten mole hydrates, resulting in dimensional instability of the block chemicals. In these conventional solid form compositions, changes in water content and temperature lead to structural and dimensional change, which may lead to a failure of the solid form, resulting in problems such as the inability of the solid form to fit into dispensers for use.

Additionally, conventional solid alkaline detergents, particularly those intended for institutional and commercial use, generally require phosphates in their compositions. The phosphates typically serve multiple purposes in the compositions, for example, to control the rate of solidification, to remove and suspend soils, and as an effective hardness sequestrant. It was found, disclosed, and claimed in U.S. Pat. Nos. 6,258,765, 6,156,715, 6,150,324, and 6,177,392, that a solid block functional material could be made using a binding agent that includes a carbonate salt, an organic acetate, such as an aminocarboxylate, or phosphonate component and water. Due to ecological concerns, further work has recently been directed to replacing phosphorous-containing compounds in detergents. In addition, nitrilotriacetic acid (NTA)-containing aminocarboxylate components used in place of phosphorous-containing compounds in some instances as a binding agents and hardness sequestrants, are believed to be carcinogenic. As such, their use has also been curtailed.

The need for solidification matrices for solid, alkaline detergents has required numerous modifications, including removal of phosphorus and/or NTA. Additional modifications include the formulation of solidification matrices incorporating caustic material (sodium hydroxide) in combination with the less caustic materials, such as soda ash (e.g. sodium carbonate), continue to present difficulty in establishing solid, physically stable tablet compositions. It has been shown that highly caustic powders for solidification fail to consistently form stable compositions, such as tablets. Therefore, there is a need for using lower levels of sodium hydroxide in combination with other less caustic materials in order to formulate dimensionally-stable solid compositions. These and other aspects of forming physically stable detergent compositions provide the background against which the present invention is provided.

In an aspect of the present invention, a physically stable phosphate-free alkaline detergent tablet composition for combination ovens is provided.

In an aspect of the present invention, methods for employing ash- and/or hydroxide-hydration to form a physically stable, phosphate-free alkaline detergent tablet containing sodium carbonate, sodium hydroxide and sodium metasilicate are provided.

In a further aspect of the invention, the compositions and methods of the invention provide physically stable compositions having durable cleaning performance, including for example in cleaning combination ovens.

SUMMARY

One embodiment of the present invention is a solid detergent composition that comprises an alkali metal hydroxide, a polycarboxylic acid polymer, sodium carbonate, water and at least one functional ingredient. According to an embodiment, if the solid detergent composition heated at a temperature of 120 degrees Fahrenheit, the composition remains dimensionally stable and has a growth exponent of less than 3%. The composition is preferably free of phosphorous.

Another embodiment is a solid detergent composition comprising between about between about 5% and about 70% sodium hydroxide by weight of the solid detergent composition; between about 20% and about 90% sodium carbonate by weight of the solid detergent composition; between about 0.1% and about 15% polycarboxylic acid polymer by weight of the solid detergent composition; between about 0.1% and about 10% water by weight of the solid detergent composition; between about 1% and about 50% secondary alkalinity source by weight of the solid detergent composition; between about 1% and about 50% chelant by weight of the solid detergent composition; wherein the detergent composition is free of phosphorus. If heated at a temperature of 120 degrees Fahrenheit, the solid detergent composition is dimensionally stable and has a growth exponent of less than 3%.

Yet a further embodiment is a method of forming a solid a detergent composition by combining sodium carbonate, an anhydrous silicate secondary alkalinity source and at least one additional functional component to form a powder pre-mix; and mixing the powder pre-mix with a water source to form a solid hydrate; and combining the solid hydrate with a source of sodium hydroxide and optionally a polycarboxylic acid polymer. In an aspect of the invention the produced solid detergent compositions are phosphorous free, and if heated at a temperature of 120 degrees Fahrenheit, the solid detergent compositions are dimensionally stable and have a growth exponent of less than 3%.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
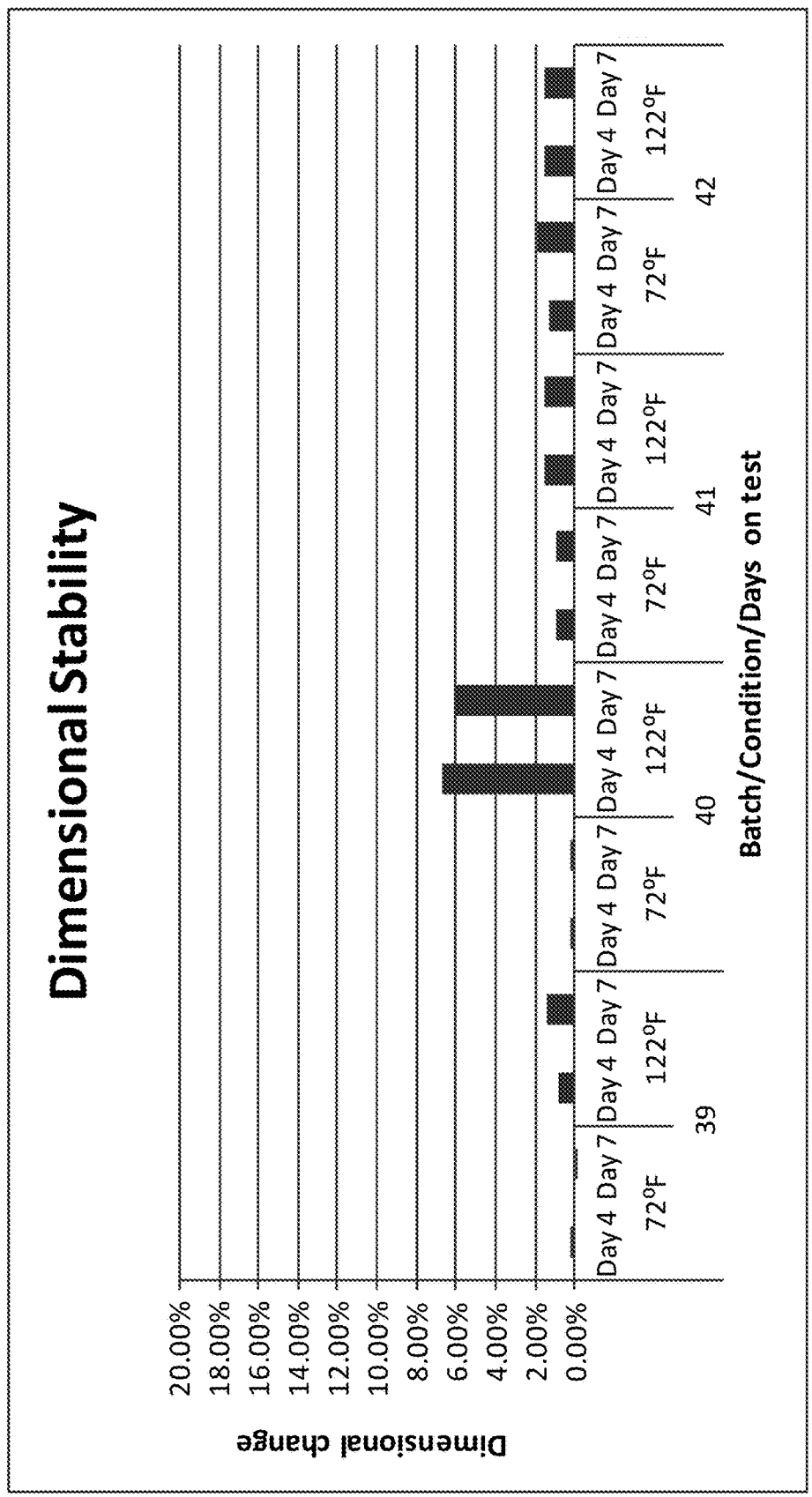
FIG. 1 is a graph showing the dimensional stability of various exemplary formulations according to embodiments of the methods and compositions of the invention.

Various embodiments of the present invention will be described in detail with reference to the drawings, wherein like reference numerals represent like parts throughout the several views. Reference to various embodiments does not limit the scope of the invention. Figures represented herein are not limitations to the various embodiments according to the invention and are presented for exemplary illustration of the invention.

DETAILED DESCRIPTION

The embodiments of this invention are not limited to particular solid detergent compositions as they may vary as understood by skilled artisans. It is further to be understood that all terminology used herein is for the purpose of describing particular embodiments only, and is not intended to be limiting in any manner or scope. For example, as used in this specification and the appended claims, the singular forms "a," "an" and "the" can include plural referents unless the content clearly indicates otherwise. Further, all units, prefixes, and symbols may be denoted in its SI accepted form. Numeric ranges recited within the specification are inclusive of the numbers defining the range and include each integer within the defined range.

Unless defined otherwise, all technical and scientific terms used herein have the same meaning as commonly understood by one of ordinary skill in the art to which embodiments of the invention pertain. Many methods and materials similar, modified, or equivalent to those described herein can be used in the practice of the embodiments of the present invention without undue experimentation, the preferred materials and methods are described herein. In describing and claiming the embodiments of the present invention, the following terminology will be used in accordance with the definitions set out below.

The term "about," as used herein, refers to variation in the numerical quantity that can occur, for example, through typical measuring and liquid handling procedures used for making concentrates or use solutions in the real world; through inadvertent error in these procedures; through differences in the manufacture, source, or purity of the ingredients used to make the compositions or carry out the methods; and the like. Whether or not modified by the term "about", the claims include equivalents to the quantities and refers to variation in the numerical quantity that can occur.

The terms "dimensional stability" and "dimensionally stable" as used herein, refer to a solid product having a growth exponent of less than about 3%, preferably less than about 2%.

The term "weight percent," "wt-%," "percent by weight," "% by weight," and variations thereof, as used herein, refer to the concentration of a substance as the weight of that substance divided by the total weight of the composition and multiplied by 100. It is understood that, as used here, "percent," "%," and the like are intended to be synonymous with "weight percent," "wt-%," etc.

According to embodiments of the invention, the solid compositions overcome a need in the prior art by providing a dimensionally stable solid composition for use in any pressed, extruded or cast solid composition containing a hydratable salt, an alkalinity active (e.g. alkali metal hydroxide) and water. In preferred aspects, the dimensionally stable solid compositions are not used in cast solid compositions. In particular, the composition would be useful for preparing a solid detergent composition that may be employed in any of a wide variety of situations where a dimensionally-stable, caustic-containing alkaline detergent that is substantially phosphorous-free and nitrilotriacetic acid (NTA)-free solid product is desired. Substantially phosphorus-free means a solidification matrix having less than approximately 0.5 wt-%, more particularly, less than approximately 0.1 wt-%, and even more particularly less than approximately 0.01 wt-% phosphorous based on the total weight of the solidification matrix. NTA-free means a solidification matrix having less than approximately 0.5 wt-%, less than approximately 0.1 wt-%, and often less than approximately 0.01 wt-% NTA based on the total weight of the solidification matrix. Accordingly, the embodiments of the present invention are particularly useful in cleaning applications where it is desired to use an environmentally friendly solid detergent.

The solidification matrix of the present invention may be employed in any of a wide variety of situations in which a dimensionally stable solid product is desired. The solidification matrix is dimensionally stable and has an appropriate rate of solidification. In addition, the solidification matrix may be free of phosphorous and NTA, making the solidification matrix particularly useful in cleaning applications where it is desired to use an environmentally friendly, solid alkaline detergent. Such applications include, but are not limited to: phosphate-free alkaline detergent use in combination ovens, such as those used in various food service industries. Additional applications may include, for example, machine and manual warewashing employing a ware wash detergent, presoaks, fryer boil outs, power soak sinks and related applications, soak tanks, instrument reprocessing, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, and/or industrial or household cleaners. Methods suitable for preparing a solid detergent composition using the solidification matrix are also provided.

Solidification Matrices and Solid Detergent Compositions

The solidification matrix generally includes an alkali metal hydroxide alkalinity source, a hydratable salt, such as sodium carbonate (soda ash), a polycarboxylic acid polymer and a water charge for forming solid compositions. The solidification matrices may further include chelants, corrosion inhibitors, additional water conditioning agents and/or additional alkalinity sources. The solidification matrices may comprise, consist of and/or consist essentially of an alkali metal hydroxide, a hydratable salt, a polycarboxylic acid polymer, a chelant, additional alkalinity and/or corrosion inhibitor source and/or a water charge.

Suitable component concentrations for the solidification matrix range from between approximately 1% and 90% by weight alkali metal hydroxide alkalinity, 0.1% and approximately 15% by weight polycarboxylic acid polymer, between approximately 0.1% and approximately 25% by weight water, and between approximately 20% and approximately 90% by weight sodium carbonate. Particularly suitable component concentrations for the solidification matrix range from between approximately 5% and 70% by weight alkali metal hydroxide alkalinity, 1% and approximately 10% by weight polycarboxylic acid polymer, between approximately 0.1% and approximately 10% by weight water, and between approximately 25% and approximately 90% by weight sodium carbonate. More particularly suitable component concentrations for the solidification matrix range from between approximately 10% and 50% by weight alkali metal hydroxide alkalinity, 2.5% and approximately 10% by weight polycarboxylic acid polymer, between approximately 1% and approximately 5% by weight water, and between approximately 30% and approximately 70% by weight sodium carbonate. Unexpectedly, according to the invention the dimensionally stable solid compositions have alkali metal hydroxide (e.g. sodium hydroxide) content up to at least 30% or greater, preferably up to at least 40% or greater, or up to at least 50% or greater, overcoming a significant limitation in the art.

In additional aspects of the invention the component concentrations for the solidification matrix further include the following ranges from between approximately 0.1% and 50% by weight chelant, such as sodium gluconate, and 0.1% and 50% by weight secondary alkalinity source and/or corrosion inhibitor. Particularly suitable component concentrations for the solidification matrix range from between approximately 1% and 50% by weight chelant, and 1% and 50% by weight secondary alkalinity source and/or corrosion inhibitor. More particularly suitable component concentrations for the solidification matrix range from between approximately 5% and 25% by weight chelant, and 1% and 20% by weight secondary alkalinity source and/or corrosion inhibitor. Those skilled in the art will appreciate other suitable component concentration ranges for obtaining comparable properties of the solidification matrix. Without being limited to the scope of the invention, all numeric ranges recited herein are inclusive of the numbers defining the range and include each integer within the defined range.

Alkalinity Source

The solid detergent composition includes an effective amount of one or more alkalinity sources to provide effective cleaning of a substrate and improve soil removal performance of the solid detergent compositions. Preferably, the alkalinity source is an alkali metal hydroxide and is provided in an effective amount to improve substrate cleaning and soil removal. The compositions of the invention include the alkalinity source in an amount of at least about 1% by weight, at least about 5% by weight, or at least about 10% by weight. In preferred aspects, the alkalinity source constitutes between about 1% and about 90% by weight, between about 5% and about 70% by weight, between about 10% and about 50% by weight, and most preferably between about 20% and about 40% by weight of the total weight of the solid detergent composition.

An effective amount of the alkalinity sources should be considered as an amount that provides a use composition having a pH of at least about 8, preferably at least about 10, and more preferably at least about 12. When the use composition has a pH of between about 8 and about 10, it can be considered mildly alkaline, and when the pH is greater than about 12, the use composition can be considered caustic.

Examples of suitable alkaline sources of the solid detergent composition include, but are not limited to an alkali metal hydroxide. Exemplary alkali metal hydroxides that can be used include, but are not limited to sodium, lithium, or potassium hydroxide. The alkali metal hydroxide may be added to the composition in any form known in the art, including as solid beads, dissolved in an aqueous solution, or a combination thereof. Alkali metal hydroxides are commercially available as a solid in the form of prilled solids or beads having a mix of particle sizes ranging from about 12-100 U.S. mesh, or as an aqueous solution, as for example, as a 45% and a 50% by weight solution. It is preferred that the alkali metal hydroxide according to the invention is added in the form of prilled solids or beads.

Hydratable Salt

The solid detergent compositions according to the invention comprise at least one hydratable salt. In one embodiment the hydratable salt is sodium carbonate (aka soda ash or ash) and/or potassium carbonate (aka potash). In a preferred aspect, the hydratable salt is sodium carbonate and excludes potassium carbonate. The hydratable salt is provided in the ranges from between approximately 20% and approximately 90% by weight, preferably between approximately 25% and approximately 90% by weight, and more preferably between approximately 30% and approximately 70% by weight hydratable salt, such as sodium carbonate. Those skilled in the art will appreciate other suitable component concentration ranges for obtaining comparable properties of the solidification matrix.

In other embodiments, the hydratable salt may be combined with other solidification agents. For example, the hydratable salt may be used with additional solidification agents that are inorganic in nature and may also act optionally as a source of alkalinity. In certain embodiments, the secondary solidification agent may include, but are not limited to: additional alkali metal hydroxides, anhydrous sodium carbonate, anhydrous sodium sulfate, anhydrous sodium acetate, and other known hydratable compounds or combinations thereof. According to a preferred embodiment, the secondary hydratable salt comprises sodium metasilicate and/or anhydrous sodium metasilicate. The amount of secondary solidifying agent necessary to achieve solidification depends upon several factors, including the exact solidifying agent employed, the amount of water in the composition, and the hydration capacity of the other detergent components. In certain embodiments, the secondary solidifying agent may also serve as an additional alkaline source.

Polycarboxylic Acid Polymers

The solid alkaline detergent compositions according to the invention include a polycarboxylic acid polymer or salt or derivative thereof. As referred to herein, the reference to any polycarboxylic acid polymer shall further encompass the salt or derivative thereof as also being a suitable polymer for use in the solid alkaline detergent compositions according to the invention. Examples of particularly suitable polycarboxylic acid polymers include, but are not limited to: polyacrylic acid polymers, polyacrylic acid polymers modified by a fatty acid end group ("modified polyacrylic acid polymers"), polymaleic acid polymers and combinations of these polymer materials. Salts of each of the polycarboxylic acid polymers may further be employed for the solid alkaline detergent compositions.

Non-limiting examples of polycarboxylic acid polymer salts include polyacrylic acid salts and derivatives, such as water soluble acrylic polymers. Such polymers include, but are not limited to, polyacrylic acid, polymethacrylic acid, acrylic acid, acrylic acid-methacrylic acid copolymers, polymaleic acid, hydrolyzed polyacrylamide, hydrolyzed methacrylamide, hydrolyzed acrylamide-methacrylamide copolymers, hydrolyzed polyacrylonitrile, hydrolyzed polymethacrylonitrile, hydrolyzed acrylonitrile methacrylonitrile copolymers, and the like, or combinations thereof or copolymers thereof. Water soluble salts or partial salts of these polymers such as their respective alkali metal (e.g., sodium, potassium, or combinations thereof) or ammonium salts can also be used according to the invention.

Examples of particularly suitable polyacrylic acid polymers and modified polyacrylic acid polymers and salts and derivatives thereof, include those having a molecular weight of between about 1,000 and about 100,000. Examples of more particularly suitable polymaleic acid polymers and salts and derivatives thereof include those having a molecular weight of between about 500 and about 5,000. An example of particularly suitable commercially available polyacrylic acid polymer and salts and derivatives thereof includes, but is not limited to, Acusol 445ND, available from Rohm & Haas LLC, Philadelphia, Pa. An example of particularly suitable commercially available modified polyacrylic acid polymer includes, but is not limited to, Alcosperse 325, available from Alco Chemical, Chattanooga, Tenn. Examples of particularly suitable commercially available polymaleic acid polymers include, but are not limited to: Belclene 200, available from Houghton Chemical Corporation, Boston, Mass. and Aquatreat AR-801, available from Alco Chemical, Chattanooga, Tenn.

In one embodiment, the solidification matrix of the present invention includes at least one polyacrylic acid polymer or salt or derivative thereof. For example, the solidification matrix may include between about 0.1% and 15% by weight, more particularly, between about 0.5% and 15% by weight polyacrylic acid polymer, between about 0.1% and 10% by weight, between about 1% and 10% by weight, more particularly, between about 2.5% and 10% by weight. Without being limited to the scope of the invention, all numeric ranges recited herein are inclusive of the numbers defining the range and include each integer within the defined range.

In alternative embodiments, the solidification matrix may include a polymaleic acid polymer and at least two polyacrylic acid polymers having different molecular weights. In a further embodiment, the solidification matrix includes at least one carboxylic acid salt in addition to the at least one polycarboxylic acid polymer. Suitable carboxylic acid salts include straight chain saturated carboxylic acid salts such as acetic acid, gluconic acid, malic acid, succinic acid, glutaric acid, adipic acid, tartaric acid, citric acid or combinations thereof. In one example the solidification includes between about 0.1% and 10% by weight carboxylic acid salt, for example citric acid salt.

Water

According to aspects of the invention, water may be both independently added to the solidification matrix and/or may be provided in the solidification matrix as a result of its presence in an aqueous material that is added to the detergent composition. Preferably, the secondary alkalinity source (e.g. silicate or metasilicate) is provided as an anhydrous silicate and therefore does not introduce water into the solidification matrix. However, the remaining components added to the detergent composition may include water or may be prepared in an aqueous premix available for reaction with the solidification matrix component(s). Water is introduced into the solidification matrix to provide the solidification matrix with desired cohesive strength or compressibility and to provide a desired rate of solidification (e.g. hydroxide and/or ash hydration according to the aspects of the invention). In addition, it is expected that the aqueous medium may help in the solidification process when is desired to form the concentrate as a solid. The water may also be provided as deionized water or as softened water.

The amount of water in the resulting solid detergent composition will depend on the methods of forming employed for the solid detergent composition (e.g. processing forming techniques). As the methods and compositions of the present invention are not preferred for use in casting (solidification occurring within a container), a lower amount of water is employed. The use of forming techniques includes a relatively smaller amount of water for solidification compared with the casting techniques. When preparing the solid detergent composition by forming techniques, water may be present in ranges of between about 1% and about 25% by weight, particularly between about 1% and about 20% by weight, and more particularly between about 2% and about 10% by weight. Without being limited to the scope of the invention, all numeric ranges recited herein are inclusive of the numbers defining the range and include each integer within the defined range.

The solidification matrix may be phosphorus-free and/or nitrilotriacetic acid (NTA)-free to make the solid detergent composition more environmentally beneficial. Phosphorus-free means a solidification matrix having less than approximately 0.5 wt-%, more particularly, less than approximately 0.1 wt-%, and even more particularly less than approximately 0.01 wt-% phosphorous based on the total weight of the solidification matrix. NTA-free means a solidification matrix having less than approximately 0.5 wt-%, less than approximately 0.1 wt-%, and often less than approximately 0.01 wt-% NTA based on the total weight of the solidification matrix. When the solidification matrix is NTA-free, the solidification matrix and resulting solid detergent composition is also compatible with chlorine, which functions as an anti-redeposition and stain-removal agent.

Additional Functional Materials

The components of the solidification matrix can be combined with various functional components used to form a solid detergent composition. In some embodiments, the solidification matrix including the alkali metal hydroxide, secondary alkalinity source, chelant, polycarboxylic acid polymer, water, and sodium carbonate make up a large amount, or even substantially all of the total weight of the detergent composition, for example, in embodiments having few or no additional functional materials disposed therein. In these embodiments, the component concentrations ranges provided above for the solidification matrix are representative of the ranges of those same components in the detergent composition. For example, such compositions may include between about 5% and 70% alkali metal hydroxide, 0.1% and 15% by weight polycarboxylic acid polymer, between about 0.1% and about 10% by weight water, between about 20% and 90% by weight sodium carbonate, between about 1% and 50% by weight secondary alkalinity source, and between about 1% and 50% by weight chelant, with the balance of the composition comprising the additional functional components. Without being limited to the scope of the invention, all numeric ranges recited herein are inclusive of the numbers defining the range and include each integer within the defined range.

The functional materials provide desired properties and functionalities to the solid detergent composition. For the purpose of this application, the term "functional materials" includes a material that when dispersed or dissolved in a use and/or concentrate solution, such as an aqueous solution, provides a beneficial property in a particular use. Some particular examples of functional materials are discussed in more detail below, although the particular materials discussed are given by way of example only, and that a broad variety of other functional materials may be used. For example, many of the functional materials discussed below relate to materials used in cleaning and/or destaining applications. However, other embodiments may include functional materials for use in other applications.

Secondary Alkaline Source

The solid detergent composition can include an effective amount of one or more secondary alkaline sources to provide alkalinity and/or enhance cleaning of a substrate and/or improve soil removal performance of the solid detergent composition. As with the alkali metal hydroxide alkalinity source, the secondary alkaline source may be provided in concentrate form.

Examples of suitable secondary alkaline sources of the solid detergent composition include, but are not limited to an alkali metal carbonates, such as sodium or potassium carbonate, bicarbonate, sesquicarbonate, and mixtures thereof; metal silicates, such as sodium or potassium silicate or metasilicate, and mixtures thereof; metal borates, such as sodium or potassium borate, and mixtures thereof; and ethanolamines and amines, and mixtures thereof. Such secondary alkalinity agents are commonly available in either aqueous or powdered form, either of which is useful in formulating the present solid detergent compositions. According to preferred embodiments of the invention, the secondary alkalinity agent is provided in a solid form.

In an aspect, silicates are preferred for use as secondary alkalinity sources. Silicates are known for conventional benefits of corrosion inhibition and/or anti-redeposition efficacy in addition to providing alkalinity. In an aspect of the present invention, the silicate secondary alkalinity source is not provided in amounts sufficient for metal protection (i.e. corrosion inhibition) as a result of the solidification composition containing the alkali metal hydroxide component. Exemplary silicates include, but are not limited to: sodium silicate and potassium silicate. As referred to herein, silicates may further include metasilicates (e.g. potassium or sodium metasilicates). Silicates and/or metasilicates can be provided as powdered, particulate or granular silicates and/or metasilicates. In addition, the silicates and/or metasilicates can be either anhydrous or contain water of hydration. In a preferred aspect of the invention, the silicates and/or metasilicates are anhydrous.

In some aspects, the secondary alkaline source is provided in an amount of between about 0.1% and about 50% by weight, between about 0.5% and about 50% by weight, between about 1% and about 50% by weight, between about 1% and about 25% by weight, and between about 5% and about 15% by weight of the total weight of the solid detergent composition. Without being limited to the scope of the invention, all numeric ranges recited herein are inclusive of the numbers defining the range and include each integer within the defined range.

Surfactants

The solid detergent composition can include at least one cleaning agent comprising a surfactant or surfactant system. A variety of surfactants can be used in a solid detergent composition, including, but not limited to: anionic, nonionic, cationic, and zwitterionic surfactants. Surfactants are an optional component of the solid detergent composition and can be excluded from the concentrate. Exemplary surfactants that can be used are commercially available from a number of sources. For a discussion of surfactants, see Kirk-Othmer, Encyclopedia of Chemical Technology, Third Edition, volume 8, pages 900-912, which is herein incorporated by reference in its entirety. When the solid detergent composition includes a cleaning agent, the cleaning agent is provided in an amount effective to provide a desired level of cleaning. The solid detergent composition, when provided as a concentrate, can include the cleaning agent in a range of about 0.05% to about 20% by weight, about 0.5% to about 15% by weight, about 1% to about 15% by weight, about 1.5% to about 10% by weight, and about 2% to about 8% by weight. Additional exemplary ranges of surfactant in a concentrate include about 0.5% to about 8% by weight, and about 1% to about 5% by weight. Without being limited to the scope of the invention, all numeric ranges recited herein are inclusive of the numbers defining the range and include each integer within the defined range.

Examples of anionic surfactants useful in the solid detergent composition include, but are not limited to: carboxylates such as alkylcarboxylates and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, and alkylether sulfates. Exemplary anionic surfactants include, but are not limited to: sodium alkylarylsulfonate, alpha-olefinsulfonate, and fatty alcohol sulfates.

Examples of nonionic surfactants useful in the solid detergent composition include, but are not limited to, those having a polyalkylene oxide polymer as a portion of the surfactant molecule. Such nonionic surfactants include, but are not limited to: chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated amines such as alkoxylated ethylene diamine; alcohol alkoxylates such as alcohol ethoxylate propoxylates, alcohol propoxylates, alcohol propoxylate ethoxylate propoxylates, alcohol ethoxylate butoxylates; nonylphenol ethoxylate, polyoxyethylene glycol ether; carboxylic acid esters such as glycerol esters, polyoxyethylene esters, ethoxylated and glycol esters of fatty acids; carboxylic amides such as diethanolamine condensates, monoalkanolamine condensates, polyoxyethylene fatty acid amides; and polyalkylene oxide block copolymers. An example of a commercially available ethylene oxide/propylene oxide block copolymer includes, but is not limited to, PLURONIC®, available from BASF Corporation, Florham Park, N.J. An example of a commercially available silicone surfactant includes, but is not limited to, ABIL® B8852, available from Goldschmidt Chemical Corporation, Hopewell, Va.

Examples of cationic surfactants that can be used in the solid detergent composition include, but are not limited to: amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, a 2-alkyl-1-(2-hydroxyethyl)-2-imidazoline, and the like; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, and a naphthylene-substituted quaternary ammonium chloride such as dimethyl-1-naphthylmethylammonium chloride. The cationic surfactant can be used to provide sanitizing properties.

Examples of zwitterionic surfactants that can be used in the solid detergent composition include, but are not limited to: betaines, imidazolines, and propionates.

Because the solid detergent composition is intended to be used in an automatic dishwashing or warewashing machine or a combination oven, the surfactants selected, if any surfactant is used, can be those that provide an acceptable level of foaming when used inside a dishwashing or warewashing machine or a combination oven. Solid detergent compositions for use in automatic dishwashing or warewashing machines are generally considered to be low-foaming compositions. Low foaming surfactants that provide the desired level of detersive activity are advantageous in an environment such as a dishwashing machine where the presence of large amounts of foaming can be problematic. In addition to selecting low foaming surfactants, defoaming agents can also be utilized to reduce the generation of foam. Accordingly, surfactants that are considered low foaming surfactants can be used. In addition, other surfactants can be used in conjunction with a defoaming agent to control the level of foaming.

Chelants, Builders and/or Water Conditioners

The solid detergent composition can include one or more building agents, also called chelating or sequestering agents (e.g., builders), including, but not limited to: an aminocarboxylic acid, or a polyacrylate. In general, a chelating agent is a molecule capable of coordinating (i.e., binding) the metal ions commonly found in natural water to prevent the metal ions from interfering with the action of the other detersive ingredients of a cleaning composition. Preferable levels of addition for builders that can also be chelating or sequestering agents are between about 0.1% to about 70% by weight, about 1% to about 60% by weight, or about 1.5% to about 50% by weight. If the solid detergent is provided as a concentrate, the concentrate can include between approximately 1% to approximately 60% by weight, between approximately 3% to approximately 50% by weight, and between approximately 6% to approximately 45% by weight of the builders. Additional ranges of the builders include between approximately 3% to approximately 20% by weight, between approximately 6% to approximately 15% by weight, between approximately 25% to approximately 50% by weight, and between approximately 35% to approximately 45% by weight. Without being limited to the scope of the invention, all numeric ranges recited herein are inclusive of the numbers defining the range and include each integer within the defined range.

In a preferred aspect, a chelant (e.g. sodium gluconate) is provided in an amount of between about 0.1% and about 50% by weight, between about 0.5% and about 50% by weight, between about 1% and about 50% by weight, between about 1% and about 25% by weight, and between about 5% and about 25% by weight of the total weight of the solid detergent composition. Without being limited to the scope of the invention, all numeric ranges recited herein are inclusive of the numbers defining the range and include each integer within the defined range.

Examples of preferred chelants for use in the non-phosphate alkaline detergent compositions include carboxylates such as citrate, tartrate or gluconate are suitable. In a preferred aspect, sodium gluconate is employed as a chelant for the solid alkaline detergent compositions.

The solid detergent compositions can contain a non-phosphorus based builder. Although various components may include trace amounts of phosphorous, a composition that is considered free of phosphorous generally does not include phosphate or phosphonate builder or chelating components as an intentionally added component. Carboxylates such as citrate, tartrate or gluconate are suitable. Useful aminocarboxylic acid materials containing little or no NTA include, but are not limited to: N-hydroxyethylaminodiacetic acid, ethylenediaminetetraacetic acid (EDTA), hydroxyethylenediaminetetraacetic acid, diethylenetriaminepentaacetic acid, N-hydroxyethyl-ethylenediaminetriacetic acid (HEDTA), diethylenetriaminepentaacetic acid (DTPA), and other similar acids having an amino group with a carboxylic acid substituent.

Water conditioning polymers can be used as non-phosphorus containing builders. Exemplary water conditioning polymers include, but are not limited to: polycarboxylates. Exemplary polycarboxylates that can be used as builders and/or water conditioning polymers include, but are not limited to: those having pendant carboxylate (—$CO_2^-$) groups such as polyacrylic acid, maleic acid, maleic/olefin copolymer, sulfonated copolymer or terpolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers. For a further discussion of chelating agents/sequestrants, see Kirk-Othmer, Encyclopedia of Chemical Technology, Third Edition, volume 5, pages 339-366 and volume 23, pages 319-320, the disclosure of which is incorporated by reference herein. These materials may also be used at substoichiometric levels to function as crystal modifiers Hardening Agents The solid detergent compositions can also include a hardening agent in addition to, or in the form of, the builder. A hardening agent is a compound or system of compounds, organic or inorganic, which significantly contributes to the uniform solidification of the composition. Preferably, the hardening agents are compatible with the cleaning agents, including the sodium hydroxide active alkalinity, and other active ingredients of the composition and are capable of providing an effective amount of hardness and/or aqueous solubility to the processed composition. The hardening agents should also be capable of forming a homogeneous matrix with the cleaning agent and other ingredients when mixed and solidified to provide a uniform dissolution of the cleaning agent from the solid detergent composition during use.

The amount of hardening agent included in the solid detergent composition will vary according to factors including, but not limited to: the type of solid detergent composition being prepared, the ingredients of the solid detergent composition, the intended use of the composition, the quantity of dispensing solution applied to the solid composition over time during use, the temperature of the dispensing solution, the hardness of the dispensing solution, the physical size of the solid detergent composition, the concentration of the other ingredients, and the concentration of the cleaning agent in the composition. It is preferred that the amount of the hardening agent included in the solid detergent composition is effective to combine with the cleaning agent and other ingredients of the composition to form a homogeneous mixture under continuous mixing conditions and a temperature at or below the melting temperature of the hardening agent.

It is also preferred that the hardening agent form a matrix with the cleaning agent and other ingredients which will harden to a solid form under ambient temperatures of approximately 30° C. to approximately 50° C., particularly approximately 35° C. to approximately 45° C., after mixing ceases and the mixture is dispensed from the mixing system, within approximately less than 1 minute, or from about 1 minute to approximately 3 hours, particularly approximately less than 2 minutes to approximately 2 hours, and particularly approximately less than 5 minutes to approximately 1 hour. A minimal amount of heat from an external source may be applied to the mixture to facilitate processing of the mixture. It is preferred that the amount of the hardening agent included in the solid detergent composition is effective to provide a desired hardness and desired rate of controlled solubility of the processed composition when placed in an aqueous medium to achieve a desired rate of dispensing the cleaning agent from the solidified composition during use.

The hardening agent may be an organic or an inorganic hardening agent. According to an aspect of the invention, it is preferred that the organic hardening agent is not a polyethylene glycol (PEG) compound, such as shown in Examples 10-23 according to the invention. Examples of polyethylene glycols include, but are not limited to: solid polyethylene glycols of the general formula H(OCH$_2$CH$_2$)—OH, where n is greater than 15, particularly approximately 30 to approximately 1700 having a variety of molecular weights. It is further preferred that the hardening agent is not urea and/or urea particles.

Preferred inorganic hardening agents are hydratable inorganic salts, including, but not limited to: sulfates and bicarbonates. The inorganic hardening agents are present at concentrations of up to approximately 50% by weight, particularly approximately 1% to approximately 25% by weight, and more particularly approximately 5% to approximately 15% by weight. Without being limited to the scope of the invention, all numeric ranges recited herein are inclusive of the numbers defining the range and include each integer within the defined range.

Bleaching Agents

Bleaching agents suitable for use in the solid detergent composition for lightening or whitening a substrate include bleaching compounds capable of liberating an active halogen species, such as $Cl_2$, $Br_2$, —$OCl^-$ and/or —$OBr^-$, under conditions typically encountered during the cleansing process. Suitable bleaching agents for use in the solid detergent compositions include, but are not limited to: chlorine-containing compounds such as chlorines, hypochlorites, or chloramines. Exemplary halogen-releasing compounds include, but are not limited to: the alkali metal dichloroisocyanurates, chlorinated trisodium phosphate, the alkali metal hypochlorites, monochloramine, and dichloramine. Encapsulated chlorine sources may also be used to enhance the stability of the chlorine source in the composition (see, for example, U.S. Pat. Nos. 4,618,914 and 4,830,773, the disclosures of which are incorporated by reference herein). A bleaching agent may also be a peroxygen or active oxygen source such as hydrogen peroxide, perborates, sodium carbonate peroxyhydrate, potassium permonosulfate, and sodium perborate mono and tetrahydrate, with and without activators such as tetraacetylethylene diamine.

When the concentrate includes a bleaching agent, it can be included in an amount of between approximately 0.1% and approximately 60% by weight, between approximately 1% and approximately 20% by weight, between approximately 3% and approximately 8% by weight, and between approximately 3% and approximately 6% by weight. Without being limited to the scope of the invention, all numeric ranges recited herein are inclusive of the numbers defining the range and include each integer within the defined range.

Fillers

The solid detergent composition can include an effective amount of detergent fillers which do not perform as a cleaning agent per se, but cooperates with the cleaning agent to enhance the overall cleaning capacity of the composition. Examples of detergent fillers suitable for use in the present cleaning compositions include, but are not limited to: sodium sulfate and sodium chloride. When the concentrate includes detergent filler, it can be included in an amount up to approximately 50% by weight, between approximately 1% and approximately 30% by weight, or between approximately 1.5% and approximately 25% by weight. Without being limited to the scope of the invention, all numeric ranges recited herein are inclusive of the numbers defining the range and include each integer within the defined range.

Defoaming Agents

A defoaming agent for reducing the stability of foam may also be included in the warewashing composition. Examples of defoaming agents include, but are not limited to: ethylene oxide/propylene block copolymers such as those available under the name Pluronic N-3; silicone compounds such as silica dispersed in polydimethylsiloxane, polydimethylsiloxane, and functionalized polydimethylsiloxane such as those available under the name Abil B9952; fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate.

A discussion of defoaming agents may be found, for example, in U.S. Pat. No. 3,048,548 to Martin et al., U.S. Pat. No. 3,334,147 to Brunelle et al., and U.S. Pat. No. 3,442,242 to Rue et al., the disclosures of which are incorporated herein by reference. When the concentrate includes a defoaming agent, the defoaming agent can be provided in an amount of between approximately 0.0001% and approximately 10% by weight, between approximately 0.001% and approximately 5% by weight, or between approximately 0.01% and approximately 1.0% by weight. Without being limited to the scope of the invention, all numeric ranges recited herein are inclusive of the numbers defining the range and include each integer within the defined range.

Anti-Redeposition Agents

The solid detergent composition can include an anti-redeposition agent for facilitating sustained suspension of soils in a cleaning solution and preventing the removed soils from being redeposited onto the substrate being cleaned. Examples of suitable anti-redeposition agents include, but are not limited to: polyacrylates, styrene maleic anhydride copolymers, cellulosic derivatives such as hydroxyethyl cellulose, hydroxypropyl cellulose and carboxymethyl cellulose. When the concentrate includes an anti-redeposition agent, the anti-redeposition agent can be included in an amount of between approximately 0.5% and approximately 10% by weight, and between approximately 1% and approximately 5% by weight. Without being limited to the scope of the invention, all numeric ranges recited herein are inclusive of the numbers defining the range and include each integer within the defined range.

Stabilizing Agents

The solid detergent composition may also include stabilizing agents. Examples of suitable stabilizing agents include, but are not limited to: borate, calcium/magnesium ions, propylene glycol, and mixtures thereof. The concentrate need not include a stabilizing agent, but when the concentrate includes a stabilizing agent, it can be included in an amount that provides the desired level of stability of the concentrate. Exemplary ranges of the stabilizing agent include up to approximately 20% by weight, between approximately 0.5% and approximately 15% by weight, and between approximately 2% and approximately 10% by weight. Without being limited to the scope of the invention, all numeric ranges recited herein are inclusive of the numbers defining the range and include each integer within the defined range.

Dispersants

The solid detergent composition may also include dispersants. Examples of suitable dispersants that can be used in the solid detergent composition include, but are not limited to: maleic acid/olefin copolymers, polyacrylic acid, and mixtures thereof. The concentrate need not include a dispersant, but when a dispersant is included it can be included in an amount that provides the desired dispersant properties. Exemplary ranges of the dispersant in the concentrate can be up to approximately 20% by weight, between approximately 0.5% and approximately 15% by weight, and between approximately 2% and approximately 9% by weight. Without being limited to the scope of the invention, all numeric ranges recited herein are inclusive of the numbers defining the range and include each integer within the defined range.

Enzymes

Enzymes that can be included in the solid detergent composition include those enzymes that aid in the removal of starch and/or protein stains. Exemplary types of enzymes include, but are not limited to: proteases, alpha-amylases, and mixtures thereof. Exemplary proteases that can be used include, but are not limited to: those derived from *Bacillus licheniformix, Bacillus lenus, Bacillus alcalophilus*, and *Bacillus* amyloliquefacins. Exemplary alpha-amylases include *Bacillus subtilis, Bacillus* amyloliquefaceins and *Bacillus licheniformis*. The concentrate need not include an enzyme, but when the concentrate includes an enzyme, it can be included in an amount that provides the desired enzymatic activity when the solid detergent composition is provided as a use composition. Exemplary ranges of the enzyme in the concentrate include up to approximately 15% by weight, between approximately 0.5% to approximately 10% by weight, and between approximately 1% to approximately 5% by weight. Without being limited to the scope of the invention, all numeric ranges recited herein are inclusive of the numbers defining the range and include each integer within the defined range.

Glass and Metal Corrosion Inhibitors

The solid detergent composition can include a metal corrosion inhibitor in an amount up to approximately 50% by weight, between approximately 1% and approximately 40% by weight, or between approximately 3% and approximately 30% by weight. Without being limited to the scope of the invention, all numeric ranges recited herein are inclusive of the numbers defining the range and include each integer within the defined range.

The corrosion inhibitor is included in the solid detergent composition in an amount sufficient to provide a use solution that exhibits a rate of corrosion and/or etching of glass that is less than the rate of corrosion and/or etching of glass for an otherwise identical use solution except for the absence of the corrosion inhibitor. It is expected that the use solution will include at least approximately 6 parts per million (ppm) of the corrosion inhibitor to provide desired corrosion inhibition properties. It is expected that larger amounts of corrosion inhibitor can be used in the use solution without deleterious effects. It is expected that at a certain point, the additive effect of increased corrosion and/or etching resistance with increasing corrosion inhibitor concentration will be lost, and additional corrosion inhibitor will simply increase the cost of using the solid detergent composition. The use solution can include between approximately 6 ppm and approximately 300 ppm of the corrosion inhibitor, and between approximately 20 ppm and approximately 200 ppm of the corrosion inhibitor. Examples of suitable corrosion inhibitors include, but are not limited to: a combination of a source of aluminum ion and a source of zinc ion, as well as an alkaline metal silicate or hydrate thereof.

The corrosion inhibitor can refer to the combination of a source of aluminum ion and a source of zinc ion. The source of aluminum ion and the source of zinc ion provide aluminum ion and zinc ion, respectively, when the solid detergent composition is provided in the form of a use solution. The amount of the corrosion inhibitor is calculated based upon the combined amount of the source of aluminum ion and the source of zinc ion. Anything that provides an aluminum ion in a use solution can be referred to as a source of aluminum ion, and anything that provides a zinc ion when provided in a use solution can be referred to as a source of zinc ion. It is not necessary for the source of aluminum ion and/or the source of zinc ion to react to form the aluminum ion and/or the zinc ion. Aluminum ions can be considered a source of aluminum ion, and zinc ions can be considered a source of zinc ion. The source of aluminum ion and the source of zinc ion can be provided as organic salts, inorganic salts, and mixtures thereof. Exemplary sources of aluminum ion include, but are not limited to: aluminum salts such as sodium aluminate, aluminum bromide, aluminum chlorate, aluminum chloride, aluminum iodide, aluminum nitrate, aluminum sulfate, aluminum acetate, aluminum formate, aluminum tartrate, aluminum lactate, aluminum oleate, aluminum bromate, aluminum borate, aluminum potassium sulfate, aluminum zinc sulfate, and aluminum phosphate. Exemplary sources of zinc ion include, but are not limited to: zinc salts such as zinc chloride, zinc sulfate, zinc nitrate, zinc iodide, zinc thiocyanate, zinc fluorosilicate, zinc dichromate, zinc chlorate, sodium zincate, zinc gluconate, zinc acetate, zinc benzoate, zinc citrate, zinc lactate, zinc formate, zinc bromate, zinc bromide, zinc fluoride, zinc fluorosilicate, and zinc salicylate.

The applicants discovered that by controlling the ratio of the aluminum ion to the zinc ion in the use solution, it is possible to provide reduced corrosion and/or etching of glassware and ceramics compared with the use of either component alone. That is, the combination of the aluminum ion and the zinc ion can provide a synergy in the reduction of corrosion and/or etching. The ratio of the source of aluminum ion to the source of zinc ion can be controlled to provide a synergistic effect. In general, the weight ratio of aluminum ion to zinc ion in the use solution can be between at least approximately 6:1, can be less than approximately 1:20, and can be between approximately 2:1 and approximately 1:15.

An effective amount of an alkaline metal silicate or hydrate thereof can be employed in the compositions and processes of the invention to form a stable solid detergent composition having metal protecting capacity. The silicates employed in the compositions of the invention are those that have conventionally been used in solid detergent formulations. For example, typical alkali metal silicates are those powdered, particulate or granular silicates which are either anhydrous or preferably which contain water of hydration (approximately 5% to approximately 25% by weight, particularly approximately 15% to approximately 20% by weight water of hydration). These silicates are preferably sodium silicates and have a $Na_2O:SiO_2$ ratio of approximately 1:1 to approximately 1:5, respectively, and typically contain available water in the amount of from approximately 5% to approximately 25% by weight. In general, the silicates have a $Na_2O:SiO_2$ ratio of approximately 1:1 to approximately 1:3.75, particularly approximately 1:1.5 to approximately 1:3.75 and most particularly approximately 1:1.5 to approximately 1:2.5. A silicate with a $Na_2O:SiO_2$ ratio of approximately 1:2 and approximately 16% to approximately 22% by weight water of hydration, is most preferred. For example, such silicates are available in powder form as GD Silicate and in granular form as Britesil H-20, available from PQ Corporation, Valley Forge, Pa. These ratios may be obtained with single silicate compositions or combinations of silicates which upon combination result in the preferred ratio. The hydrated silicates at preferred ratios, a $Na_2O:SiO_2$ ratio of approximately 1:1.5 to approximately 1:2.5, have been found to provide the optimum metal protection and rapidly form a solid detergent. Hydrated silicates are preferred.

Silicates can be included in the solid detergent composition to provide for metal protection but are additionally known to provide alkalinity and additionally function as anti-redeposition agents. Exemplary silicates include, but are not limited to: sodium silicate and potassium silicate. The solid detergent composition can be provided without silicates, but when silicates are included, they can be included in amounts that provide for desired metal protection. The concentrate can include silicates in amounts of at least approximately 1% by weight, at least approximately 5% by weight, at least approximately 10% by weight, and at least approximately 15% by weight. In addition, in order to provide sufficient room for other components in the concentrate, the silicate component can be provided at a level of less than approximately 35% by weight, less than approximately 25% by weight, less than approximately 20% by weight, and less than approximately 15% by weight. Without being limited to the scope of the invention, all numeric ranges recited herein are inclusive of the numbers defining the range and include each integer within the defined range.

Fragrances and Dyes

Various dyes, odorants including perfumes, and other aesthetic enhancing agents can also be included in the composition. Suitable dyes that may be included to alter the appearance of the composition, include, but are not limited to: Direct Blue 86, available from Mac Dye-Chem Industries, Ahmedabad, India; Fastusol Blue, available from Mobay Chemical Corporation, Pittsburgh, Pa.; Acid Orange 7, available from American Cyanamid Company, Wayne, N.J.; Basic Violet 10 and Sandolan Blue/Acid Blue 182, available from Sandoz, Princeton, N.J.; Acid Yellow 23, available from Chemos GmbH, Regenstauf, Germany; Acid Yellow 17, available from Sigma Chemical, St. Louis, Mo.; Sap Green and Metanil Yellow, available from Keyston Analine and Chemical, Chicago, Ill.; Acid Blue 9, available from Emerald Hilton Davis, LLC, Cincinnati, Ohio; Hisol Fast Red and Fluorescein, available from Capitol Color and Chemical Company, Newark, N.J.; and Acid Green 25, Ciba Specialty Chemicals Corporation, Greenboro, N.C.

Fragrances or perfumes that may be included in the compositions include, but are not limited to: terpenoids such as citronellol, aldehydes such as amyl cinnamaldehyde, a jasmine such as C1S-jasmine or jasmal, and vanillin.

Flow Aids

Various flow aids can also be included in the composition. Flow aids may further be referred to as carriers and/or glidants and are generally known for improving the processing of compositions, such as the solid detergent compositions according to the invention. Suitable components for improving the flowability of the homogenous powder components according to the invention, may include for example, inorganic or organic agents. According to an aspect, inorganic agents are preferred, including for example silicas, borates, acetate salts, sulfate salts and the like. Silicas, including for example the precipitated or fumed forms (e.g., Sipernat®, Aerosil®, CAB-O-SIL®) can be employed and are commercially available, for example from Evonik Industries.

Methods of Making and Use

Without being limited to a particular theory of the invention, the actual solidification mechanism may occur through hydroxide hydration, e.g. the interaction of the sodium hydroxide (or other alkali metal hydroxide) with water. It is believed that the combination of the sodium hydroxide and secondary alkalinity source (e.g. sodium metasilicate) along with the polycarboxylic acid polymer functions to control the kinetics and thermodynamics of the solidification process and provides a solidification matrix in which additional functional materials may be bound to form a functional solid composition. For example, the polycarboxylic acid polymer and other functional ingredients may have efficacy in stabilizing the hydroxide by acting as donor and/or acceptor of free water.

In other aspects of the invention, there may be aspects of solidification as a result of ash hydration, e.g. the interaction of the hydratable salt with water. For example, according to such embodiments, the carbonate hydrates by acting as a donor and/or acceptor of free water.

According to aspects of the invention, by controlling the rate of water migration for hydration of the ash and/or hydroxide alkalinity source, the rate of solidification of the detergent compositions may be controlled to provide process and dimensional stability to the resulting solid detergent composition product. The rate of solidification is significant because if the solidification matrix solidifies too quickly, the composition may solidify during mixing and stop processing. If the solidification matrix solidifies too slowly, valuable process time is lost.

Without being limited to a particular theory of the invention, in an aspect the polycarboxylic acid polymer may assist in providing dimensional stability to the end product by ensuring that the solid product containing the sodium hydroxide and secondary alkalinity source (e.g. sodium metasilicate) does not swell. If the solid product swells after solidification, various problems may occur, including but not limited to: decreased density, integrity, and appearance;

and inability to dispense or package the solid product. Generally, a solid product is considered to have dimensional stability if the solid product has a growth exponent of less than about 3% and particularly less than about 2%. Growth exponent refers to the percent growth or swelling of a product over a period of time after solidification under normal transport/storage conditions. Because normal transport/storage conditions for detergent products often results in the detergent composition being subjected to an elevated temperature, the growth exponent of a solid detergent product may be determined by measuring one or more dimensions of the product prior to and after heating at between 100° F. and 120° F. The measured dimension or dimensions depends on the shape of the solid product and the manner in which it swells. For tablets, the change in both diameter and height is generally measured and added together to determine the growth exponent. For capsules, just the diameter is normally measured.

In general, a solid detergent composition using the solidification matrix of the present invention can be created by combining the alkali metal hydroxide alkalinity source (e.g. sodium hydroxide), secondary alkalinity source (e.g. anhydrous sodium metasilicate), polycarboxylic acid polymer, sodium carbonate, water, and any additional functional components and allowing the components to interact and solidify.

For example, in a first embodiment, the solid detergent composition may include sodium hydroxide, anhydrous sodium metasilicate, polycarboxylic acid polymer, a water charge, sodium carbonate, a chelant and optional functional ingredients. In an exemplary embodiment, the solid detergent composition includes between approximately 1% and 90% by weight alkali metal hydroxide alkalinity, 0.1% and approximately 15% by weight polycarboxylic acid polymer, between approximately 0.1% and approximately 25% by weight water, between approximately 20% and approximately 90% by weight sodium carbonate, between approximately 0.1% and 50% by weight chelant, such as sodium gluconate, and 0.1% and 50% by weight secondary alkalinity source and/or corrosion inhibitor. In another exemplary embodiment, the solid detergent composition includes between approximately 5% and 70% by weight alkali metal hydroxide alkalinity, 1% and approximately 10% by weight polycarboxylic acid polymer, between approximately 0.1% and approximately 10% by weight water, between approximately 25% and approximately 90% by weight sodium carbonate, between approximately 1% and 50% by weight chelant, and 1% and 50% by weight secondary alkalinity source and/or corrosion inhibitor. In yet another exemplary embodiment the solid detergent composition includes between approximately 10% and 50% by weight alkali metal hydroxide alkalinity, 2.5% and approximately 10% by weight polycarboxylic acid polymer, between approximately 1% and approximately 5% by weight water, between approximately 30% and approximately 70% by weight sodium carbonate, between approximately 1% and 50% by weight chelant, and 1% and 50% by weight secondary alkalinity source and/or corrosion inhibitor. Without being limited to the scope of the invention, all numeric ranges recited herein are inclusive of the numbers defining the range and include each integer within the defined range.

In some embodiments, the relative amounts of sodium hydroxide, water and polycarboxylic acid polymer are controlled within a composition. The solidification matrix and additional functional components harden into solid form due to the chemical reaction of the sodium hydroxide and water (hydroxide hydration), and/or the sodium carbonate (ash hydration) with the water. As the solidification matrix solidifies, a binder composition can form to bind and solidify the components. At least a portion of the ingredients associate to form the binder while the balance of the ingredients forms the remainder of the solid composition. The solidification process may last from a few minutes to about six hours, depending on factors including, but not limited to: the size of the formed composition, the ingredients of the composition, and the temperature of the composition.

According to an aspect of the invention, the hydratable salt (e.g. sodium carbonate), secondary alkalinity source (e.g. anhydrous sodium metasilicate) and at least one additional functional ingredient are combined into a homogenous powder mixture. A water source is added to the homogenous powder mixture prior to incorporation into the detergent composition, and can be provided as a solid hydrate. According to an aspect of the invention, the addition of water to the homogenous powder mixture is referred to herein as a water "charge." A water charge is included in the solidification matrix for subsequent combination with the sodium hydroxide (and optionally the polycarboxylic acid polymer). In an aspect, a water charge of less than about 10% is preferred, from about 1% to about 10%, or from about 2% to about 10%.

Thereafter, the solid hydrate is then combined with sodium hydroxide (and optionally the polycarboxylic acid polymer). The sodium hydroxide is combined with the water and sodium carbonate matrix when added to the detergent composition for the detergent composition to effectively solidify according to the methods of the invention. In general, an effective amount of the sodium hydroxide and sodium carbonate refer to amounts that effectively control the kinetics and thermodynamics of the solidification system by controlling the rate and movement of water into the hydroxide hydration process and/or ash hydration process.

Solid detergent compositions formed using the solidification matrix are produced using a batch or continuous mixing system. In an exemplary embodiment, a processing method of a tablet press is used to form tablets from the homogeneous mixtures according to the methods of the invention. In some embodiments, the processing temperature is at or below the melting temperature of the components. The processed mixture may be dispensed from the mixer by forming, or other suitable means, whereupon the detergent composition hardens to a solid form. The structure of the matrix may be characterized according to its hardness, melting point, material distribution, crystal structure, and other like properties according to known methods in the art. Generally, a solid detergent composition processed according to the method of the invention is substantially homogeneous with regard to the distribution of ingredients throughout its mass and is dimensionally stable.

Specifically, in a forming process, the liquid and solid components are introduced into the final mixing system and are continuously mixed until the components form a substantially homogeneous semi-solid mixture in which the components are distributed throughout its mass. In an exemplary embodiment, the components are mixed in the mixing system for at least approximately 5 seconds. The mixture is then discharged from the mixing system into, or through, a die or other shaping means. The product is then packaged. In an exemplary embodiment, the formed composition begins to harden to a solid form in less than 1 minute, or between approximately 1 minute and approximately 3 hours. Particularly, the formed composition begins to harden to a solid form in between a few seconds to about 1 minute. More particularly, the formed composition begins to harden to a solid form in between approximately a few seconds to about 2 minutes.

By the term "solid form", it is meant that the hardened composition will not flow and will substantially retain its shape under moderate stress or pressure or mere gravity. The degree of hardness of the solid composition may range from that of a fused solid product which is relatively dense and hard, for example, like concrete, to a consistency characterized as being a hardened paste. In addition, the term "solid" refers to the state of the detergent composition under the expected conditions of storage and use of the solid detergent composition. In general, it is expected that the detergent composition will remain in solid form when exposed to temperatures of up to approximately 100° F. and particularly greater than approximately 120° F.

The resulting solid detergent composition may take forms including, but not limited to: an extruded, molded or formed solid pellet, block, tablet, powder, granule, flake; or the formed solid can thereafter be ground or formed into a powder, granule, or flake. In an embodiment of the invention, the solid detergent compositions are not cast solid products. In an exemplary embodiment, extruded pellet materials formed by the solidification matrix have a weight of between approximately 50 grams and approximately 250 grams, extruded solids formed by the solidification matrix have a weight of approximately 100 grams or greater, and solid block detergents formed by the solidification matrix have a mass of between approximately 0.25 and approximately 10 kilograms. The solid compositions provide for a stabilized source of functional materials. In some embodiments, the solid composition may be dissolved, for example, in an aqueous or other medium, to create a concentrated and/or use solution. The solution may be directed to a storage reservoir for later use and/or dilution, or may be applied directly to a point of use.

In certain embodiments, the solid detergent composition is provided in the form of a unit dose. A unit dose refers to a solid detergent composition unit sized so that the entire unit is used during a single washing cycle. According to aspects of the invention, when the solid detergent composition is provided as a unit dose, it is typically provided as an extruded pellet, or a tablet having a size of between approximately 1 gram and approximately 250 grams.

In other embodiments, the solid detergent composition is provided in the form of a multiple-use solid, such as a block or a plurality of pellets, and can be repeatedly used to generate aqueous detergent compositions for multiple washing cycles. In certain embodiments, the solid detergent composition is provided as an extruded block, or a tablet having a mass of between approximately 5 grams and approximately 10 kilograms. In certain embodiments, a multiple-use form of the solid detergent composition has a mass between approximately 1 kilogram and approximately 10 kilograms. In further embodiments, a multiple-use form of the solid detergent composition has a mass of between approximately 5 kilograms and about approximately 8 kilograms. In other embodiments, a multiple-use form of the solid detergent composition has a mass of between about approximately 5 grams and approximately 1 kilogram, or between approximately 5 grams and approximately 500 grams.

Although the detergent composition is discussed as being formed into a solid product, the detergent composition may also be provided in the form of a paste. When the concentrate is provided in the form of a paste, enough water is added to the detergent composition such that complete solidification of the detergent composition is precluded. In addition, dispersants and other components may be incorporated into the detergent composition in order to maintain a desired distribution of components.

The various solidification matrices of the present invention may be employed in a wide variety of cleaning applications. In some aspects, the solid detergent compositions of the invention are suitable for use in any applications requiring an environmentally friendly, solid alkaline detergent. Such applications include, but are not limited to: phosphate-free alkaline detergent use in combination ovens, such as those used in various food service industries. Additional applications may include, for example, machine warewashing employing a ware wash detergent, presoaks, fryer boil outs, power soak sinks and related applications, soak tanks, instrument reprocessing, laundry and textile cleaning and destaining, carpet cleaning and destaining, vehicle cleaning and care applications, surface cleaning and destaining, kitchen and bath cleaning and destaining, floor cleaning and destaining, cleaning in place operations, general purpose cleaning and destaining, and/or industrial or household cleaners.

In preferred aspects, the solid detergent compositions are particularly suited for cleaning combination ovens. Various descriptions of combination ovens are disclosed, for example, in U.S. Pat. Nos. 5,368,008, 5,640,946, and 6,410,890, EP 0652405 and DE 2842771 each of which are incorporated herein by reference in their entirety. For example, combination ovens may refer to apparatuses having a double oven-steamer, a double oven-boiler, or having at least one oven chamber and a steam generator and/or boiler. The solid detergent compositions according to the invention can be provided for cleaning of the combination oven apparatuses known in the art.

In some aspects, the solid detergent compositions may be added directly to a combination oven apparatus, for example through a funnel or other member, as described and depicted for example in U.S. Pat. No. 5,640,946, instead of having to access the steamer and/or boiler components of the combination ovens. These and other inlet points for supplying a solid detergent composition according to the invention will be readily ascertainable by those skilled in the art. In some aspects, the solid detergent compositions according to the invention may be initially used to generate an aqueous solution or suspension for delivery to a combination oven for cleaning according to the invention. Thereafter, the liquid compositions are applied to the internal surfaces of the apparatus, such as for example, through the use of spray nozzles and/or spray jets or the like.

The methods of cleaning using the solid detergent compositions according to the invention may further include one or more rinse steps, decalcification steps, a prewash step, and/or a soak step.

EXAMPLES

The present invention is more particularly described in the following examples that are intended as illustrations only, since numerous modifications and variations within the scope of the present invention will be apparent to those skilled in the art. Unless otherwise noted, all parts, percentages, and ratios reported in the following examples are on a weight basis, and all reagents used in the examples were obtained, or are available, from the chemical suppliers described below, or may be synthesized by conventional techniques.

The following test method was used to characterize the compositions produced in Examples 1, 2, and 3 and Comparative Examples A and B:

Dimensional Stability Test for Formed Products

Approximately 50 grams batch of the product using a polycarboxylic acid polymer as part of the solidification matrix was first pressed in a die at approximately 1000 pounds per square inch (psi) for approximately 20 seconds to form tablets. The diameter and height of the tablets were measured and recorded. The tablets were maintained at room temperature for one day and then placed in an oven at a temperature of approximately 120° F. After the tablets were removed from the oven, the diameters and heights of the tablets were again measured and recorded. The growth exponent was determined for the tablets by measuring growth based on the cumulative change in the diameter and height of the tablet after heating.

Examples 1, 2, and 3 and Comparative Examples A and B

Examples 1, 2, and 3 are compositions of the present invention using a polycarboxylic acid polymer as part of a solidification matrix. In particular, the compositions of Examples 1, 2, and 3 used a polyacrylic acid polymer, a modified polyacrylic acid polymer, and a polymaleic acid polymer, respectively, as part of the solidification matrix. In addition, the compositions of Examples 1, 2, and 3 also included component concentrations (in weight percent) of sodium carbonate (soda ash or dense ash), sodium bicarbonate, sodium metasilicate, a builder, surfactant, defoamers, sodium hydroxide, and water as provided in Table 1. The sodium carbonate, sodium bicarbonate, sodium metasilicate, builder, surfactant, and defoamers were premixed to form a powder premix and the polycarboxylic acid polymer, sodium hydroxide, and water were premixed to form a liquid premix. The powder premix and the liquid premix were then mixed together to form the composition. Approximately 50 grams of the composition were pressed into a tablet at approximately 1000 psi for approximately 20 seconds.

The composition of Comparative Example A was prepared as in Examples 1, 2, and 3, except that the composition of Comparative Example A did not include a polycarboxylic acid polymer.

The composition of Comparative Example B was prepared as in Example 1 except for the addition of Trilon M Powder, which is a methylglycinediacetic acid (MGDA) powder. Table 1 provides the component concentrations for the compositions of Example 1, 2, and 3 and Comparative Example A. Table 2 provides the component concentrations of Comparative Example B.

TABLE 1

| Component | Example 1 | Example 2 | Example 3 | Comp. Example A |
|---|---|---|---|---|
| Sodium carbonate, wt. % | 55.76 | 56.76 | 57.33 | 58.19 |
| Sodium bicarbonate, wt. % | 2.88 | 2.88 | 2.88 | 2.88 |
| Sodium metasilicate, wt. % | 3 | 3 | 3 | 3 |
| Builder, wt. % | 20 | 20 | 20 | 20 |
| Nonionic surfactant, wt. % | 3.53 | 3.53 | 3.53 | 3.53 |
| Defoamer, wt. % | 1.06 | 1.06 | 1.06 | 1.06 |
| Polyacrylic acid, wt. % | 7.34 | 0 | 0 | 0 |
| Modified polyacrylic acid, wt. % | 0 | 9 | 0 | 0 |
| Polymaleic acid, wt. % | 0 | 0 | 7.05 | 0 |
| Sodium hydroxide (50%), wt. % | 2.66 | 0 | 2.37 | 0 |
| Water, wt. % | 3.77 | 3.77 | 2.78 | 11.34 |

TABLE 2

| Component | Comp. Example B |
|---|---|
| Sodium carbonate, wt. % | 43.52 |
| Trilon M Powder, wt. % | 13.24 |
| Sodium bicarbonate, wt. % | 2.88 |
| Anhydrous metasilicate, wt. % | 3.00 |
| Builder, wt. % | 20.00 |
| Nonionic surfactant, wt. % | 3.53 |
| Defoamer, wt. % | 1.06 |
| Modified polyacrylic acid, wt. % | 9.00 |
| Water, wt. % | 3.77 |

The compositions of Examples 1, 2, and 3 and Comparative Example A were then subjected to the dimensional stability test for formed products, as discussed above, to observe the dimensional stability of the compositions after heating. The results are tabulated below in Table 3.

TABLE 3

| Example | Dimension | Initial | Post-heating | % Growth |
|---|---|---|---|---|
| Example 1 | Diameter, mm | 44.69 | 44.96 | 0.6 |
|  | Height, mm | 20.64 | 20.87 | 1.1 |
| Example 2 | Diameter, mm | 44.69 | 44.71 | 0 |
|  | Height, mm | 19.76 | 19.64 | −0.6 |
| Example 3 | Diameter, mm | 45.03 | 45.44 | 0.9 |
|  | Height, mm | 19.66 | 19.89 | 1.2 |
| Comparative Example A | Diameter, mm | 44.77 | 46 | 2.7 |
|  | Height, mm | 19.38 | 20.96 | 8.2 |

As illustrated in Table 3, the formed products of the compositions of Examples 1, 2, and 3 exhibited considerably less swelling than the formed product of the composition of Comparative Example A. In particular, the product of the composition of Example 1 had only a 0.6% growth in diameter and a 1.1% growth in height resulting in a growth exponent of 1.7%. The product of the composition of Example 2 had a 0% growth in diameter and a −0.6% growth in height resulting in no positive growth exponent. The product of the composition of Example 3 only had a 0.9% growth in diameter and a 1.2% growth in height resulting in a growth exponent of 2.1%. By comparison, the product of the composition of Comparative Example A had a 2.7% growth in diameter and an 8.2% growth in height resulting in a growth exponent of 10.9%.

The only difference in the compositions of Examples 1, 2, and 3 and Comparative Example A was the presence of a polycarboxylic acid polymer. It is thus believed that the polycarboxylic acid polymer aided in the dimensional stability of the products of the compositions of Example 1, Example 2, and Example 3. Because the composition of Comparative Example A did not contain a polycarboxylic acid polymer, the composition did not include a mechanism for controlling the movement of water within the solid product.

Six tablet samples of the composition of Comparative Example B were also tested for swelling. The diameter and height of each such tablet were measured and recorded. The tablets were maintained at room temperature for one day and then placed in an oven heated to a temperature of approximately 120° F. When the first tablet was removed from the oven, the tablet crumbled, indicating a lack of a dimensionally stable product. The remaining samples were successfully removed from the oven and the diameter and height of each tablet were measured and recorded as set forth in Table 4 below.

TABLE 4

| Comparative Example C | | Initial | Post-heating | % Growth | % Total Growth |
|---|---|---|---|---|---|
| Sample 2 | Diameter (mm) | 44.35 | 45.25 | 2.029 | 4.65 |
| | Height (mm) | 19.49 | 20.00 | 2.617 | |
| Sample 3 | Diameter (mm) | 44.23 | 45.20 | 2.193 | 5.29 |
| | Height (mm) | 19.04 | 19.63 | 3.099 | |
| Sample 4 | Diameter (mm) | 44.52 | 45.23 | 1.595 | 4.69 |
| | Height (mm) | 19.38 | 19.98 | 3.096 | |
| Sample 5 | Diameter (mm) | 44.38 | 45.17 | 1.780 | 4.65 |
| | Height (mm) | 19.22 | 19.75 | 2.758 | |
| Sample 6 | Diameter (mm) | 44.23 | 45.11 | 1.990 | 5.02 |
| | Height (mm) | 19.12 | 19.70 | 3.033 | |

As can be seen by the results in Table 4, when subjected to a temperature of 120 degrees Fahrenheit, each of Samples 1, 2, 3, 4, 5 and 6 including MGDA were not stable and/or exhibited growth of over 4.5%.

Dimensional Stability Test for Cast Products

Approximately 4000 grams batch of the product using a polycarboxylic acid polymer as part of the solidification matrix was first poured into a capsule. The diameter of the capsule was measured and recorded. The capsule was maintained at room temperature for one day, held in an oven at a temperature of approximately 104° F. for two days, and then returned to room temperature. After the capsule returned to room temperature, the diameter of the capsule was again measured and recorded. The growth exponent was determined for the capsules by measuring growth based on the change in the diameter after heating.

Examples 4, 5, and 6 and Comparative Example C

Examples 4, 5, and 6 are compositions of the present invention using a polycarboxylic acid polymer as a part of the solidification matrix. In particular, the composition of Example 4 used a polyacrylic acid polymer as part of the solidification matrix, the composition of Example 5 used a modified polyacrylic acid polymer as part of the solidification matrix, and the composition of Example 6 used polymaleic acid polymer as part of the solidification matrix. Each of the compositions of Examples 4, 5, and 6 also included component concentrations (in weight percent) of softened water, builder, water conditioner, sodium hydroxide 50%, sodium carbonate (dense ash), anionic surfactant, and nonionic surfactant, as provided in Table 3. The liquids (softened water, builder, water conditioner, polycarboxylic acid polymer, and sodium hydroxide 50%) were premixed in order to form a liquid premix and the powders (sodium carbonate, anionic surfactant, and nonionic surfactant) were premixed in order to form a powder premix. The liquid premix and the powder premix were then mixed to form the composition, which was subsequently poured into capsules.

The composition of Comparative Example C was prepared as in Examples 4, 5, and 6 except that the composition of Comparative Example C did not contain a polycarboxylic acid polymer but did contain the same quantity of available water.

Table 5 provides the component concentrations for the compositions of Examples 4-6 and Comparative Example C.

TABLE 5

| Component | Example 4 | Example 5 | Example 6 | Comp. Example C |
|---|---|---|---|---|
| Water, softened, wt. % | 22.49 | 22.5 | 20.49 | 24 |
| Builder, wt. % | 4 | 4 | 0 | 4 |
| Water conditioner wt. % | 3 | 3 | 3 | 3 |
| Polyacrylic acid, wt. % | 0 | 10 | 0 | 0 |
| Modified polyacrylic acid, wt. % | 10 | 0 | 0 | 0 |
| Polymaleic Acid, wt. % | 0 | 0 | 10 | 0 |
| NaOH, 50%, wt. % | 0 | 0 | 3.4 | 0 |
| Sodium carbonate, wt. % | 55.51 | 55.5 | 58.12 | 63.64 |
| Anionic surfactant, wt. % | 1 | 1 | 1 | 1 |
| Nonionic surfactant, wt. % | 4 | 4 | 4 | 4 |

After the compositions of Examples 4, 5, and 6 and Comparative Example C were formed, they were subjected to the dimensional stability test for cast products, as discussed above, to observe the dimensional stability of the compositions after heating. The results are tabulated below in Table 6.

TABLE 6

| | | Initial | Post-heating | % Growth |
|---|---|---|---|---|
| Example 4 | Diameter, mm | 161 | 162 | 0.6 |
| Example 5 | Diameter, mm | 159 | 161 | 1.3 |
| Example 6 | Diameter, mm | 159 | 162 | 1.9 |
| Comp. Example C | Diameter, mm | 162 | 170 | 4.9 |

As illustrated in Table 4, the cast products of the compositions of Examples 4, 5, and 6 exhibited considerably less swelling than the cast product of the composition of Comparative Example C. In particular, the product of the composition of Example 4 experienced only a 0.6% growth in diameter resulting in a 0.6% growth exponent, the product of Example 5 experienced only a 1.3% growth in diameter resulting in a 1.3% growth exponent, and the product of the composition of Example 6 experienced only a 1.9% growth in diameter resulting in a 1.9% growth exponent. By comparison, the product of the composition of Comparative Example C had a 4.9% growth in diameter resulting in a 4.9% growth exponent.

The only difference in the compositions of Examples 4, 5, and 6 and Comparative Example C was the presence of a polycarboxylic acid polymer. It is thus believed that the polycarboxylic acid polymer aided in the dimensional stability of the products of the compositions of Examples 4, 5, and 6. By contrast, because the composition of Comparative Example C did not contain a polycarboxylic acid polymer, the composition did not contain a mechanism for controlling the movement of water within the solid product.

Examples 7, 8 and 9

Examples 7, 8 and 9 compare cleaning performance when various combinations of polymaleic acid and polyacrylic acid were utilized. The composition of each Example is set forth in Table 7. To form the compositions, the sodium carbonate, builder, surfactant, and disaccharide were premixed to form a powder premix and the polycarboxylic acid polymer, potassium hydroxide, phosphonate and water were premixed to form a liquid premix. The powder premix and the liquid premix were then mixed together to form the composition. Approximately 1000 grams of the composition was pressed into a tablet at approximately 1000 psi for approximately 20 seconds and allowed to solidify.

The resulting tablets were employed in an AM-14 automatic dishwasher machine dispensing 17 grain water. Glassware was then subjected to 100 wash and rinse cycles and tested for cleanliness. Cleanliness was measured in two ways. First, a luminosity value was determined by acquiring a digital optical image of the glassware, and then analyzing a luminosity value via computer analysis. The luminosity test indicates the degree of film present on the glass surface, with a lower value indicating less film and a cleaner glass. Second, a visual rating was measured on a 1 to 5 rating scale, with a lower visual rating indicating a cleaner glass. The results of these tests are set forth in Table 8.

TABLE 7

| Raw Material | Example 7 | Example 8 | Example 9 |
| --- | --- | --- | --- |
| Sodium carbonate | 71.80 | 71.80 | 71.80 |
| Builder | 7.50 | 7.50 | 7.50 |
| Nonionic surfactant | 3.68 | 3.68 | 3.68 |
| Nonionic surfactant | 2.02 | 2.02 | 2.02 |
| Water | 9.39 | 7.61 | 8.39 |
| Disaccharide | 2.00 | 2.00 | 2.00 |
| Polymaleic Acid (Belclene 200) | 1.00 | 1.00 | 0.00 |
| Polyacrylic acid 4500 | 0.90 | 0.00 | 0.90 |
| Polyacrylic acid 11,000 | 0.96 | 0.00 | 0.96 |
| Phosphonate | 0.30 | 0.30 | 0.30 |
| Potassium Hydroxide | 0.45 | 0.45 | 0.45 |
| | 100.00 | 96.36 | 98.00 |
| | 1000 PPM | 946 ppm | 980 ppm |

TABLE 8

| | Example 7 | | Example 8 | | Example 9 | |
| --- | --- | --- | --- | --- | --- | --- |
| Glass | visual rating | luminosity value | visual rating | luminosity value | visual rating | luminosity value |
| 1 | 2.50 | 15610 | 3.00 | 17720 | 3.00 | 19653 |
| 2 | 2.00 | 14250 | 3.00 | 16752 | 3.00 | 19539 |
| 3 | 2.00 | 14664 | 3.00 | 16955 | 3.50 | 24913 |
| 4 | 2.00 | 15005 | 3.50 | 21742 | 3.50 | 20485 |
| 5 | 2.50 | 14949 | 3.00 | 16615 | 3.00 | 18191 |
| 6 | 2.50 | 15389 | 3.50 | 18392 | 3.00 | 18759 |
| Plastic | 2.5 | N/A | 2.5 | N/A | 4 | N/A |
| 6 Glass Average: | 2.29 | 14978 | 3.07 | 18029 | 3.29 | 20257 |
| 6 Glass Std. Dev.: | 0.27 | 490 | 0.35 | 1939 | 0.39 | 2413 |
| 4 Glass Average: | 2.13 | 14717 | 3.13 | 18016 | 3.25 | 20782 |
| 4 Glass Std. Dev.: | 0.25 | 345 | 0.25 | 2488 | 0.29 | 2910 |

The results set forth in Table 8 indicate that the combination of polymaleic acid and polyacrylic acid provides improved cleaning performance versus polymaleic acid or polyacrylic acid alone.

Examples 10-23

A series of experiments using different concentrations and sources of water, chelants, and binders were employed to evaluate the use of sodium hydroxide alkalinity to generate a solid alkaline detergent composition according to the objectives of the invention. Various formulas and mix instructions for making solid, phosphate-free alkaline detergent tablets were evaluated to provide methods for making the physically stability and durable cleaning compositions according to the invention. Table 9 shows the components evaluated including: potassium carbonate (alkaline builder); sodium sulfate (filler); sodium gluconate (chelant); disodium metasilicate (alkalinity source, corrosion inhibitor); sodium hydroxide (active cleaner, caustic); and PEG (binder).

TABLE 9

| | Examples | | | | | | |
| --- | --- | --- | --- | --- | --- | --- | --- |
| Component | 10 | 11 | 12 | 13 | 14 | 15 | 16 |
| potassium carbonate, wt. % | 28.33 | 30 | 35 | 33.33 | 30 | 35 | 35 |
| sodium sulfate, wt. % | 13.34 | 15 | 15 | 13.34 | 15 | 5 | 5 |
| sodium gluconate, wt. % | 10 | 10 | 10 | 10 | 10 | 10 | 10 |
| disodium metasilicate, wt. % | 15 | 15 | 15 | 15 | 15 | 15 | 15 |
| Sodium hydroxide, wt. % | 25 | 25 | 25 | 25 | 25 | 25 | 25 |
| PEG 8000, wt. % | 8.33 | 5 | 0 | 3.33 | 5 | 10 | 10 |
| Total | 100 | 100 | 100 | 100 | 100 | 100 | 100 |

| | Examples | | | | | | |
| --- | --- | --- | --- | --- | --- | --- | --- |
| Component | 17 | 18 | 19 | 20 | 21 | 22 | 23 |
| potassium carbonate, wt. % | 33.33 | 30 | 35 | 31.66 | 25 | 25 | 35 |
| sodium sulfate, wt. % | 8.34 | 10 | 15 | 11.67 | 15 | 15 | 10 |
| sodium gluconate, wt. % | 10 | 10 | 10 | 10 | 10 | 10 | 10 |
| disodium metasilicate, wt. % | 15 | 15 | 15 | 15 | 15 | 15 | 15 |
| Sodium hydroxide, wt. % | 25 | 25 | 25 | 25 | 25 | 25 | 25 |
| PEG 8000, wt. % | 8.33 | 10 | 0 | 6.67 | 10 | 10 | 5 |
| Total | 100 | 100 | 100 | 100 | 100 | 100 | 100 |

Good batch mixing and powder transfer was observed for Examples 10-23. Powder appearance varied from batch to batch and particle size uniformity was dependent upon content of polyethylene glycol (PEG). A visual evaluation showed that the powders not including PEG in its composition were most uniform, but agglomerate formation increases as the amount of PEG in the formula increases. Agglomerates are formed when the molten PEG was added to the batch during mixing.

Dimensional Stability Test for Extruded and Press Solids. Screening was done at 2500, 3000, and 4000 lbs. It was found that pressing at 4000 lbs. produced the best tablets. Tablets made at this load had good crisp edges, smooth surfaces and high compression strength. Tablets made at the other two loads had a more porous surface and weak edges. Tablet release from the pressing mold for all 14 runs was poor. The pressing head had to be washed free of residue after every 2-3 tablets pressed. For example, if the residue was not removed after the third tablet, then the fourth tablet would not pull free of the pressing head and could only be removed either by blunt force or dissolving the tablet with water.

Using PEG 8000 as the potential binder in the high alkaline formula caused the tablets to brown over time. The color stability was dependent on how much PEG was included in the formula. Examples 12 and 19 contained no PEG and showed no discoloration over time. For all Examples that contained PEG 8000, browning was observed as early as 1 day in the 122° F. chamber.

Dimensional Stability. Initial height, diameter, and visual appearance were recorded. Next the tablets were sealed in a plastic bag and placed inside two different environmental chambers for a week. The two environmental chambers used were ambient (72° F., 50% Relative Humidity) and 122° F. (relative humidity NA). After one week the tablets were re-measured and the visual appearance recorded.

Procedure for Determining Compression Resistance of Extruded and Pressed Products. One tablet from each batch was tested within three hours of being made. After the one week dimensional stability tests were complete the 122° F. tablets were cooled to ambient conditions, and then compression strength was measured for both set of tablets. The formulations tested were not physically stable at 122° F. Tablets swelled between 4% and 10%, and tablets containing both PEG 8000 and sodium hydroxide turned brown. The results show that the compositions according to the invention do not include PEG as a preferred binder for the stable, phosphate-free alkaline oven cleaner tablet compositions.

Examples 24-29

Based on the results of Examples 10-23, alternative solidification mechanisms, namely carbonate hydration, were further evaluated. Hydrate potassium and sodium carbonates were evaluated to determine effect on tablet stability using different chelants.

Table 10 shows the components evaluated including: potassium carbonate/potash (alkaline builder); sodium carbonate/ash (alkaline builder); sodium citrate (chelant, binder); sodium hydroxide (active cleaner, caustic, hydration (50%)); water (hydration); disodium metasilicate (alkalinity source, corrosion inhibitor); and sodium sulfate (filler).

TABLE 10

| | Examples | | | | | |
|---|---|---|---|---|---|---|
| Component | 24 | 35 | 26 | 27 | 28 | 29 |
| potassium carbonate, wt. % | 25 | 25 | 0 | 0 | 25 | 25 |
| Sodium carbonate, wt. % | 0 | 0 | 25 | 25 | 0 | 0 |
| sodium citrate, wt. % | 10 | 10 | 10 | 10 | 10 | 10 |
| Sodium hydroxide (50%), wt. % | 5 | 7 | 5 | 7 | 0 | 0 |
| water, wt. % | 0 | 0 | 0 | 0 | 2.5 | 4 |
| disodium metasilicate, wt. % | 15 | 15 | 15 | 15 | 15 | 15 |
| sodium sulfate, wt. % | 20 | 18 | 20 | 18 | 22.5 | 21 |
| Sodium hydroxide, wt. % | 25 | 25 | 25 | 25 | 25 | 25 |
| Total | 100 | 100 | 100 | 100 | 100 | 100 |

The potassium carbonate, sodium carbonate and sodium citrate were added to the ribbon blender and mixed. The sodium hydroxide (50%) and water were added and mixed until the powder appeared dry. The disodium metasilicate, sodium sulfate and sodium hydroxide were added and mixed until the powder appeared uniform. Examples 24-29 did not provide adequate mixing; powders were wet, clumpy, and hard to get out of the ribbon blender. Because of poor mixing the powders were not pressed into tablets and the experiment was terminated.

Examples 30-38

Based on the results of Examples 24-29, the use of sodium carbonate in place of potassium carbonate was evaluated. The use of sodium carbonate (dense ash) was evaluated in compositions to obtain a more physically stable tablet formulation.

Table 11 shows the components evaluated including: sodium carbonate (alkaline builder); sodium citrate (chelant, binder); citrate solution (33%); sodium hydroxide (active cleaner, caustic, hydration (50%)); water (hydration); disodium metasilicate (alkalinity source, corrosion inhibitor); and sodium sulfate (filler).

TABLE 11

| | Examples | | | | | | | | |
|---|---|---|---|---|---|---|---|---|---|
| Component | 30 | 31 | 32 | 33 | 34 | 35 | 36 | 37 | 38 |
| sodium carbonate, wt. % | 25 | 45.5 | 47.5 | 46.5 | 45.5 | 47.5 | 44 | 25 | 25 |
| sodium citrate, wt. % | 10 | 10 | 10 | 10 | 7.75 | 8.75 | 10 | 10 | 10 |
| Citrate/water sol (33%), wt. % | 0 | 0 | 0 | 0 | 6.8 | 3.78 | 0 | 0 | 0 |
| water, wt. % | 2.5 | 4.5 | 2.5 | 3.5 | 0 | 0 | 6 | 4.5 | 2.5 |

TABLE 11-continued

| Component | Examples | | | | | | | | |
|---|---|---|---|---|---|---|---|---|---|
| | 30 | 31 | 32 | 33 | 34 | 35 | 36 | 37 | 38 |
| disodium metasilicate, wt. % | 15 | 15 | 15 | 15 | 15 | 15 | 15 | 15 | 15 |
| sodium sulfate, wt. % | 22.5 | 0 | 0 | 0 | 0 | 0 | 0 | 20.5 | 22.5 |
| Sodium hydroxide, wt. % | 25 | 25 | 25 | 25 | 25 | 25 | 25 | 25 | 25 |
| Total | 100 | 100 | 100 | 100 | 100 | 100 | 100 | 100 | 100 |

For examples 30-36, the sodium carbonate was added to the ribbon blender and mixed. The sodium citrate was slowly added. Then the water/citrate solutions and disodium metasilicate were mixed until the powder was uniform. Thereafter, 60 gram tablets were pressed at 4000 pounds (approximately 1600 psi) and at 2500 pounds, holding for 3 seconds using the 1.75" diameter tablet die and the Carver press. Then the force required to break a tablet was measured (higher force/pressure required translates to a more durable tablet). The tablets were then placed on dimensional stability testing for one week at room temperature and 122° F.

For examples 37-38, the sodium carbonate and sodium citrate was added to the ribbon blender and mixed. The water and disodium metasilicate were added and mixed until the powder was uniform. Then the 60 gram tablets were pressed at 4000 pounds (approximately 1600 psi) and at 2500 pounds, holding for 3 seconds using the 1.75" diameter tablet die and the Carver press. The force required to break a tablet was measured (higher force/pressure required translates to a more durable tablet). Then the tablets were then placed on dimensional stability testing for one week at room temperature and 122° F.

Although the formulations tested were physically stable at 72° F., the formulations were not physically stable at 122° F. Tablets swelled between 9% and 18% and compression strengths were weak in all Examples 30-38. Example 33 showed improved compression strength and dimensional stability compared to the other examples, however the formulation required additional improvements to the solidification and dimensional stability.

Examples 39-42

Based on the results of Examples 30-38, the use of a different grade of sodium metasilicate was evaluated. Anhydrous sodium metasilicate was used in formulations with potassium carbonate at a lower water level to assess improvement of solidification and dimensional stability. Table 12 shows the components evaluated in the Example compositions.

TABLE 12

| Component | Examples | | | |
|---|---|---|---|---|
| | 39 | | 40 | |
| potassium carbonate, wt. % | 25% | 150 g | 48% | 288 g |
| sodium citrate, wt. % | 10% | 60 g | 10% | 60 g |
| water, wt. % | 1% | 6 g | 2% | 12 g |
| disodium metasilicate, wt. % | 15% | 90 g | 15% | 90 g |
| sodium sulfate, wt. % | 24% | 144 g | 0 | 0 |
| Sodium hydroxide, wt. % | 25% | 150 g | 25% | 150 g |
| Total | 100 | 600 g | 100 | 600 g |

TABLE 12-continued

| Component | Examples | | | |
|---|---|---|---|---|
| | 41 | | 42 | |
| sodium carbonate, wt. % | 25% | 150 g | 46.5% | 279 g |
| sodium citrate, wt. % | 10% | 60 g | 10% | 60 g |
| anhydrous metasilicate, wt. % | 35.5% | 213 g | 15% | 90 g |
| water, wt. % | 4O5% | 27 g | 3.5% | 21 g |
| sodium hydroxide, wt. % | 25% | 150 g | 25% | 150 g |
| Total | 100 | 600 g | 100 | 600 g |

For examples 39-40, the potassium carbonate and sodium citrate were added to the ribbon blender and mixed. The water was slowly added. Then the disodium metasilicate, sodium sulfate and sodium hydroxide were mixed until the powder was uniform. Thereafter, 25 gram tablets were pressed at 2000 pounds, holding for 3 seconds using the 1.25" diameter tablet die and the Carver press. Then the force required to break a tablet was measured (higher force/pressure required translates to a more durable tablet). The tablets were then placed on dimensional stability testing for one week at room temperature and 122° F.

For examples 41-42, the sodium carbonate, sodium citrate and anhydrous metasilicate were added to the ribbon blender and mixed. The water was slowly added. Then the sodium hydroxide was mixed until the powder was uniform. Thereafter, 25 gram tablets were pressed at 2000 pounds, holding for 3 seconds using the 1.25" diameter tablet die and the Carver press. Then the force required to break a tablet was measured (higher force/pressure required translates to a more durable tablet). The tablets were then placed on dimensional stability testing for one week at room temperature and 122° F.

Figure 2:
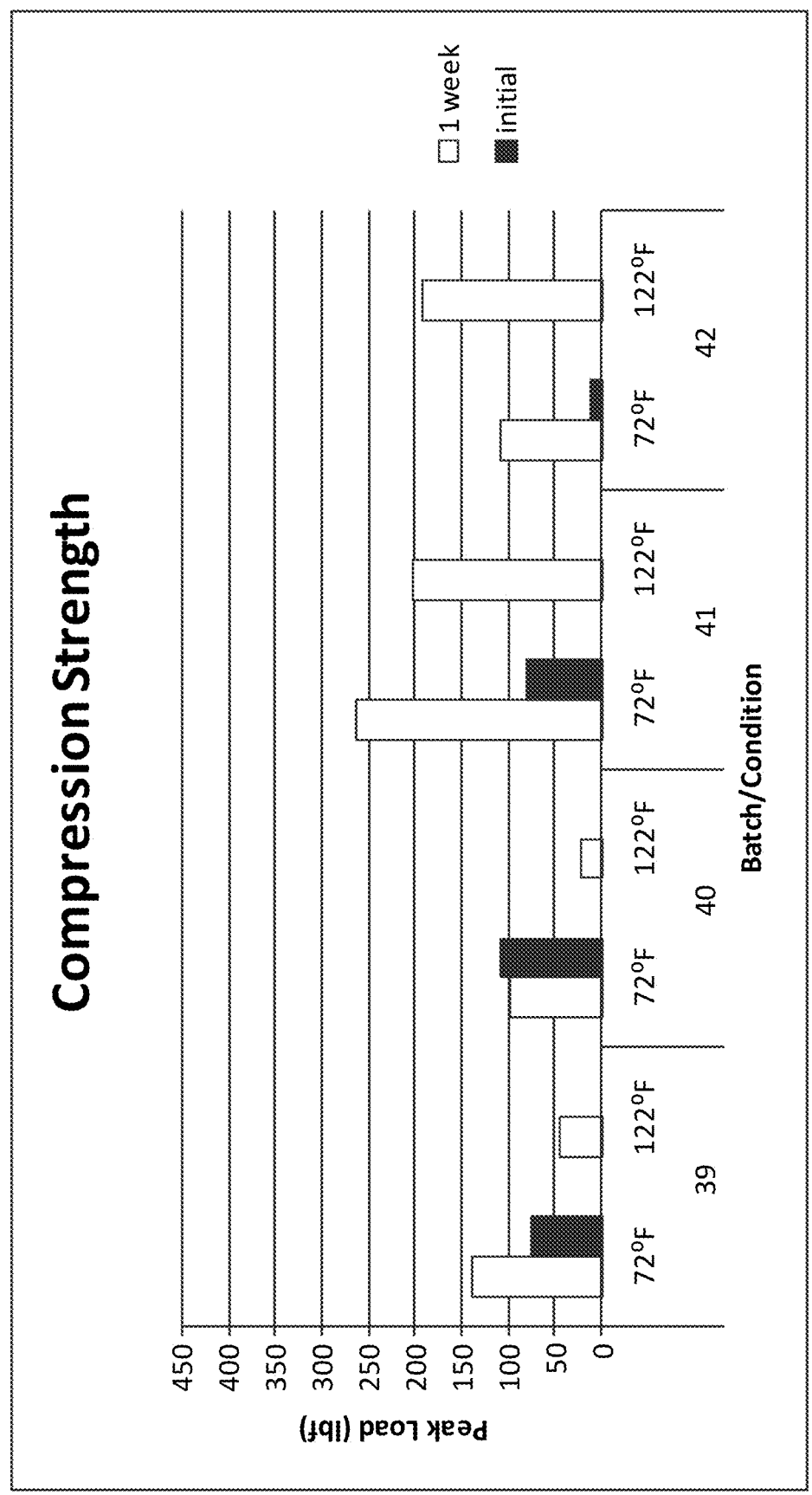
FIG. 2 is a graph showing compression strength of various exemplary formulations according to embodiments of the methods and compositions of the invention.

As shown in FIGS. 1-2, the formulation of the table compositions with anhydrous sodium metasilicate generated stronger tablets with less swelling than the prior Examples using disodium metasilicate penta-hydrate. In addition, the Example shows that the use of potassium carbonate is capable of yielding dimensionally-stable solid compositions when the water charge employed during mixing is less than about 1%. However, the additional benefits of using sodium carbonate, namely improved cleaning performance, result in its preferred use over the potassium carbonate.

Examples 43-46

Based on the results of Examples 39-42, the use of varying concentrations and sources of water to make a durable and physically stable tablet composition were evaluated. Table 13 shows the components evaluated in the Example compositions.

TABLE 13

| Component | Examples | | | |
| --- | --- | --- | --- | --- |
| | 43 | 44 | 45 | 46 |
| sodium carbonate, wt. % | 40 | 37 | 37 | 42 |
| d-gluconic acid, monosodium salt, wt. % | 15 | 15 | 15 | 0 |
| sodium citrate, wt. % | 0 | 0 | 0 | 10 |
| disodium metasilicate penta-hydrate, wt. % | 10 | 10 | 0 | 0 |
| anhydrous metasilicate, wt. % | 0 | 0 | 10 | 10 |
| water, wt. % | 0 | 3 | 3 | 3 |
| sodium polyacrylate, wt. % | 5 | 5 | 5 | 5 |
| sodium hydroxide, wt. % | 30 | 30 | 30 | 30 |
| Total | 100 | 100 | 100 | 100 |
| Total Water | 4.2 | 7.2 | 3 | 4.2 |

For examples 43-46, the sodium carbonate, d-gluconic acid, sodium citrate, sodium metasilicate and/or anhydrous metasilicate were added to the ribbon blender and mixed. The water was slowly added. Then the sodium polyacrylate polymer and sodium hydroxide were mixed until the powder was uniform. Thereafter, 60 gram tablets were pressed at 4000 pounds (approximately 1600 psi) and at 2500 pounds, holding for 3 seconds using the 1.75" diameter tablet die and the Carver press. Then the force required to break a tablet was measured (higher force/pressure required translates to a more durable tablet). The tablets were then placed on dimensional stability testing for one week at room temperature and 122° F.

Figure 3:
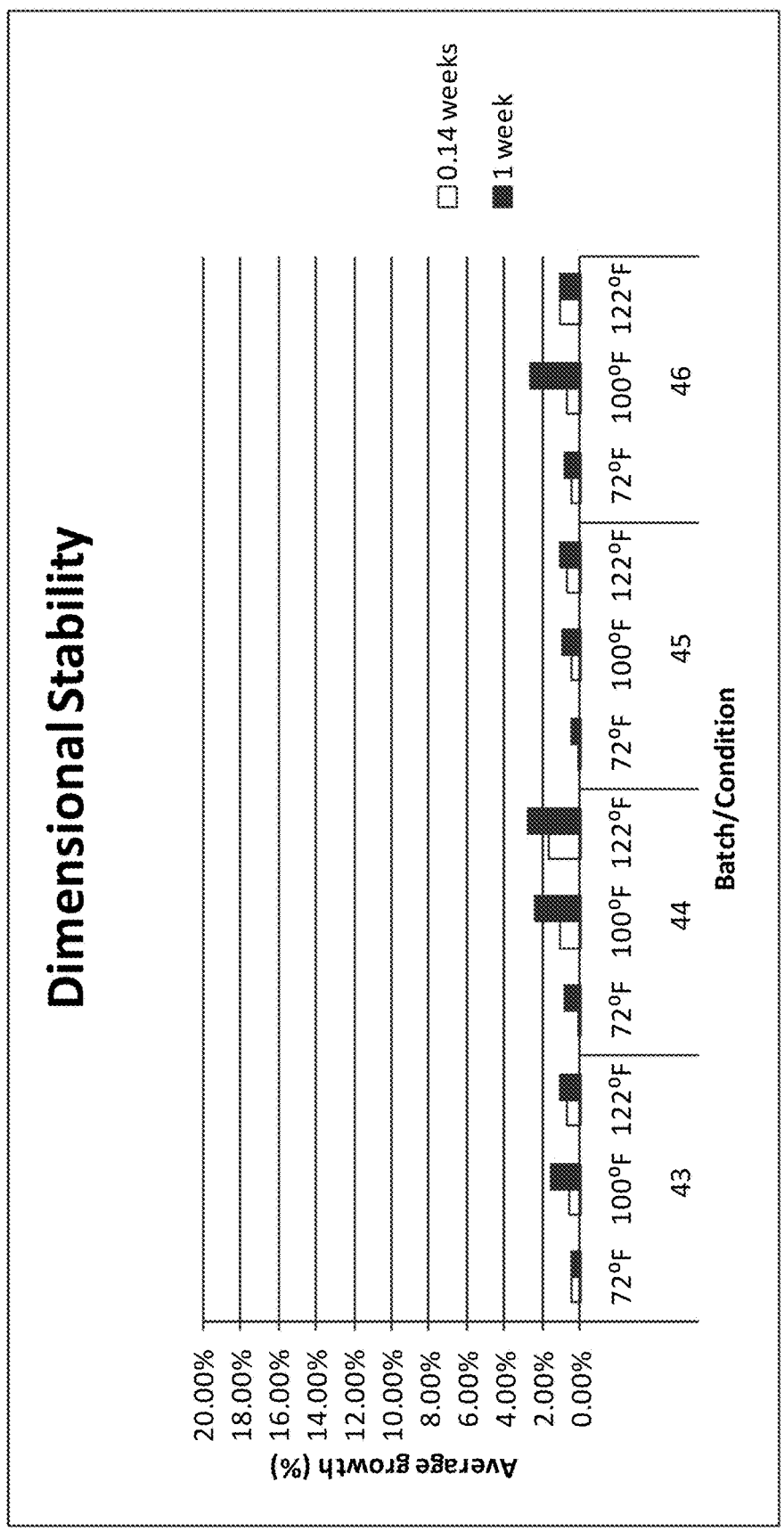
FIG. 3 is a graph showing the dimensional stability of various exemplary formulations according to embodiments of the methods and compositions of the invention.
Figure 4:
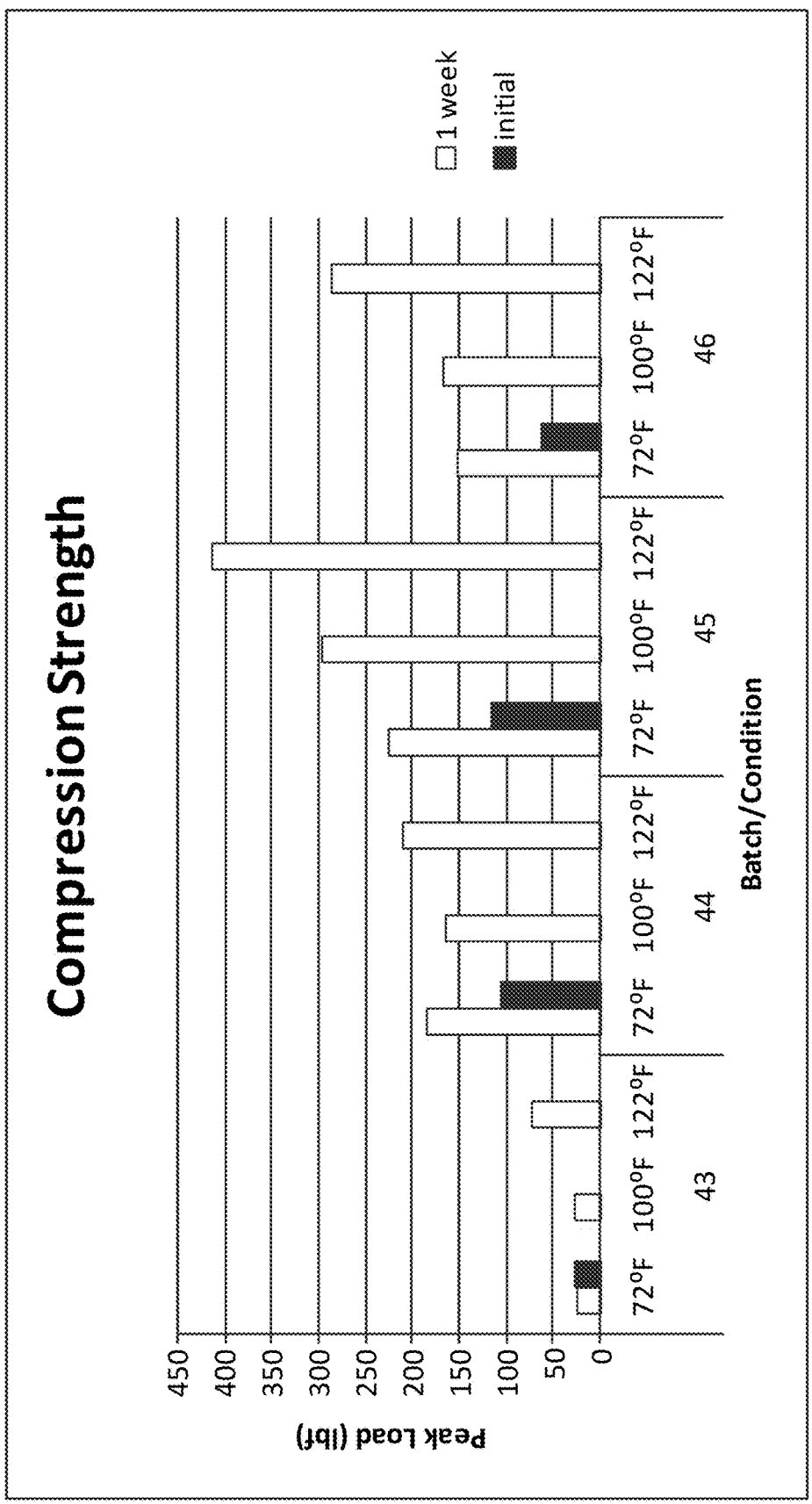
FIG. 4 is a graph showing compression strength of various exemplary formulations according to embodiments of the methods and compositions of the invention.

As shown in FIGS. 3-4 the Example formulations that were mixed with a liquid water charge had higher compression strengths than the Example formulations that did not have a free water charge. Example 45 yielded the hardest tablets with the least amount of swelling (indicating greatest dimensional stability).

Although the present invention has been described with reference to preferred embodiments, workers skilled in the art will recognize that changes may be made in form and detail without departing from the spirit and scope of the invention.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the above described features.

All publications and patent applications in this specification are indicative of the level of ordinary skill in the art to which this invention pertains. All publications and patent applications are herein incorporated by reference to the same extent as if each individual publication or patent application was specifically and individually indicated by reference.

The following is claimed:

1. A pressed solid detergent composition comprising:
an alkali metal hydroxide alkalinity source;
sodium carbonate in an amount between 40 wt. % and 90 wt. %;
an anhydrous silicate secondary alkalinity source in an amount between 1% and 10% by weight of the composition;
water, wherein the total water of the composition is in an amount between 0.1 wt. % and 4 wt. %;
at least two polycarboxylic acid polymers having different molecular weights wherein the at least two polycarboxylic acid polymers comprise an acrylic acid polymer having a molecular weight from 1,000 g/mol to 100,000 g/mol;
an aminocarboxylic acid; and
a phosphonate in an amount less than 1 wt. %,
wherein the polycarboxylic acid polymers, aminocarboxylic acid and phosphonate comprise up to 35 wt. % of the composition.

2. The composition of claim 1, wherein the at least two polyacrylic acid polymers having different molecular weights have molecular weights from 1,000 g/mol to 100,000 g/mol.

3. The composition of claim 1, wherein the at least two polycarboxylic acid polymers comprise a polyacrylic acid polymer or salt or derivative thereof.

4. The composition of claim 3, wherein the polyacrylic acid polymer or salt or derivative thereof has a molecular weight from 1,000 g/mol to 100,000 g/mol.

5. The composition of claim 1, wherein the at least two polycarboxylic acid polymers comprise an acrylic acid polymer.

6. The composition of claim 5, wherein the acrylic acid polymer has a molecular weight from 1,000 g/mol to 100,000 g/mol.

7. The composition of claim 1, wherein the aminocarboxylic acid comprises methylglycinediacetic acid (MGDA), diethylenetriaminepentaacetic acid (DTPA), N hydroxyethyl ethylenediaminetriacetic acid (HEDTA), ethylenediaminetetraacetic acid (EDTA), or combinations thereof.

8. The composition of claim 1, wherein the sodium carbonate constitutes between about 50% and about 70% by weight of the composition, wherein the total water of the composition constitutes between about 1% and 4% by weight of the composition, and wherein the alkali metal hydroxide is sodium hydroxide and constitutes between about 5% and 70% by weight of the composition.

9. The composition of claim 1, further comprising at least one functional ingredient comprising, detergent builder, surfactant, corrosion inhibitor, water conditioning agent, chelant, flow aid or combinations thereof.

10. The composition of claim 1, wherein the composition has less than about 0.5 wt-% phosphorous based on the total weight of the solid composition.

11. A pressed solid detergent composition comprising: an alkali metal hydroxide alkalinity source;
between about 40 wt. % and about 90 wt. % of sodium carbonate;
between about 1 wt. % and about 10 wt. % of an anhydrous silicate secondary alkalinity source;
at least two polycarboxylic acid polymers having different molecular weights, wherein the at least two polycarboxylic acid polymers comprise an acrylic acid polymer having a molecular weight from 1,000 g/mol to 100,000 g/mol;
an aminocarboxylic acid comprising methylglycinediacetic acid (MGDA), diethylenetriaminepentaacetic acid (DTPA), N hydroxyethyl ethylenediaminetriacetic acid (HEDTA), ethylenediaminetetraacetic acid (EDTA), or combinations thereof;
water of hydration; and
a phosphonate in an amount less than 1 wt. %;
wherein the polycarboxylic acid polymers, aminocarboxylic acid, and phosphonate comprise up to 35 wt. % of the composition.

12. The composition of claim 11, wherein the sodium carbonate constitutes between about 50% and about 70% by weight of the composition.

13. The composition of claim 11, wherein the total water in the composition constitutes between about 1% and 4% by weight of the composition.

14. The composition of claim 11, wherein the alkali metal hydroxide is sodium hydroxide and constitutes between about 5% and 70% by weight of the composition.

15. The composition of claim 11, further comprising at least one functional ingredient comprises detergent builder, surfactant, corrosion inhibitor, water conditioning agent, chelant, flow aid or combinations thereof.

16. The composition of claim 11, wherein the composition has less than about 0.5 wt-% phosphorous based on the total weight of the solid composition.

\* \* \* \* \*

UNITED STATES PATENT AND TRADEMARK OFFICE
CERTIFICATE OF CORRECTION

PATENT NO.        : 10,457,902 B2
APPLICATION NO.   : 14/587519
DATED             : October 29, 2019
INVENTOR(S)       : Caleb W. Jones et al.

Page 1 of 1

It is certified that error appears in the above-identified patent and that said Letters Patent is hereby corrected as shown below:

In Claim 1, Column 34, Line 5:
DELETE: "wt. %,"
INSERT: --wt. %;--

In Claim 11, Column 34, Line 63:
After "to", insert --about--

Signed and Sealed this
Seventh Day of April, 2020

Andrei Iancu
*Director of the United States Patent and Trademark Office*